US011691650B2

(12) United States Patent
Li et al.

(10) Patent No.: US 11,691,650 B2
(45) Date of Patent: Jul. 4, 2023

(54) SYSTEMS AND METHODS FOR GENERATING MOTION FORECAST DATA FOR A PLURALITY OF ACTORS WITH RESPECT TO AN AUTONOMOUS VEHICLE

(71) Applicant: UATC, LLC, San Francisco, CA (US)

(72) Inventors: Lingyun Li, Toronto (CA); Bin Yang, Toronto (CA); Ming Liang, Toronto (CA); Wenyuan Zeng, Toronto (CA); Mengye Ren, Toronto (CA); Sean Segal, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 620 days.

(21) Appl. No.: 16/801,933

(22) Filed: Feb. 26, 2020

(65) Prior Publication Data

US 2021/0009166 A1 Jan. 14, 2021

Related U.S. Application Data

(60) Provisional application No. 62/930,620, filed on Nov. 5, 2019, provisional application No. 62/871,436, filed on Jul. 8, 2019.

(51) Int. Cl.
*B60W 60/00* (2020.01)
*G06F 16/903* (2019.01)
(Continued)

(52) U.S. Cl.
CPC ........... *B60W 60/00272* (2020.02); *B60W 60/00274* (2020.02); *G06F 16/903* (2019.01);
(Continued)

(58) Field of Classification Search
None
See application file for complete search history.

(56) References Cited

U.S. PATENT DOCUMENTS 10,671,076 B1 * 6/2020 Kobilarov ............. G08G 1/166
11,062,454 B1 * 7/2021 Cohen ................... G06V 10/82
(Continued)

OTHER PUBLICATIONS

Sallab et al., "Deep Reinforcement Learning framework for Autonomous Driving", Apr. 8, 2017 (Year: 2017).*
(Continued)

*Primary Examiner* — Tamara L Weber
(74) *Attorney, Agent, or Firm* — Dority & Manning, P.A.

(57) ABSTRACT

A computing system can be configured to input data that describes sensor data into an object detection model and receive, as an output of the object detection model, object detection data describing features of the plurality of the actors relative to the autonomous vehicle. The computing system can generate an input sequence that describes the object detection data. The computing system can analyze the input sequence using an interaction model to produce, as an output of the interaction model, an attention embedding with respect to the plurality of actors. The computing system can be configured to input the attention embedding into a recurrent model and determine respective trajectories for the plurality of actors based on motion forecast data received as an output of the recurrent model.

20 Claims, 8 Drawing Sheets

(51) Int. Cl.
*G06N 3/08* (2023.01)
*G06N 3/044* (2023.01)
*G06N 3/045* (2023.01)

(52) U.S. Cl.
CPC ............. *G06N 3/044* (2023.01); *G06N 3/045* (2023.01); *G06N 3/08* (2013.01)

(56) References Cited

U.S. PATENT DOCUMENTS

| | | | | |
|---|---|---|---|---|
| 2018/0173240 | A1* | 6/2018 | Fang | G06N 3/08 |
| 2019/0113917 | A1* | 4/2019 | Buch | G05D 1/0285 |
| 2020/0148201 | A1* | 5/2020 | King | G06N 20/00 |
| 2020/0160172 | A1* | 5/2020 | Fang | G06N 3/08 |
| 2021/0114604 | A1* | 4/2021 | Nagaraja | B60W 50/0097 |
| 2021/0182596 | A1* | 6/2021 | Adams | G06K 9/6256 |
| 2021/0341920 | A1* | 11/2021 | Singh | G05D 1/0221 |

OTHER PUBLICATIONS

Montironi, "An Attention-Based Methodology for Context Identification and Exploitation in Autonomous Robots", 2018, Dissertation, University of California, Davis (Year: 2018).*

Alahi et al., "Social LSTM: Human Trajectory Prediction in Crowded Spaces", IEEE/Computer Society Conference on Computer Vision and Pattern Recognition (CVPR 2016), Jun. 26-Jul. 1, 2016, Las Vegas, NV, 11 pages.

Bansal et al., "ChauffeurNet: Learning to Drive by Imitating the Best and Synthesizing the Worst", arXiv:1812.03079v1, Dec. 7, 2018, 20 Pages.

Bickson, "Gaussian Belief Propagation: Theory and Application", arXiv:0811.2518v1, Nov. 15, 2008, 86 pages.

Brown, "Iterative Solutions Of Games By Fictitious Play", Activity Analysis of Production and Allocation, vol. 13, No. 1, 1951, pp. 374-376.

Casas et al., "IntentNet: Learning to Predict Intention from Raw Sensor Data", Conference on Robot Learning (CoRL 2018), Oct. 29-31, 2018, Zurich, Switzerland, 10 pages.

Chen et al, "Multi-View 3D Object Detection Network for Autonomous Driving", IEEE Computer Society Conference on Computer Vision and Pattern Recognition (CVPR 2017), Jul. 21-26, 2017, Honolulu, HI, pp. 1907-1915.

Chen et al., "3D Object Proposals for Accurate Object Class Detection", NIPS 2015, Dec. 7-12, 2015, Montreal, Canada, 9 pages.

Chen et al., "Monocular 3D Object Detection for Autonomous Driving", IEEE/Computer Society Conference on Computer Vision and Pattern Recognition (CVPR 2016), Jun. 26-Jul. 1, 2016, Las Vegas, NV, pp. 2147-2156.

Chou et al., "Predicting Motion of Vulnerable Road Users using High-Definition Maps and Efficient ConvNets", arXiv:1906.08469v1, Jun. 20, 2019, 9 pages.

Connolly et al., "Some Contagion Models of Speeding", Accident Analysis & Prevention, vol. 25, Issue 1, Feb. 1993, pp. 57-66.

Cosgun et al., "Towards Full Automated Drive in Urban Environments: A Demonstration in GoMentum Station, California", arXiv:1705.01187v1, May 2, 2017, 8 pages.

Cui et al., "Multimodal Trajectory Predictions for Autonomous Driving using Deep Convolutional Networks", arXiv:1809.10732v2, Mar. 1, 2019, 7 pages.

Cui et al., "Multimodal Trajectory Predictions for Autonomous Driving using Deep Convolutional Networks", arXiv:1809.10732v1, Sep. 18, 2018, 7 pages.

Deng et al., "ImageNet: A Large-Scale Hierarchical Image Database", IEE Computer Society Conference on Computer Vision and Pattern Recognition (CVPR 2009), Jun. 20-25, 2009, Miami, FL, pp. 1-8.

Deo et al., "Convolutional Social Pooling for Vehicle Trajectory Prediction", IEEE/CVF Conference on Computer Vision and Pattern Recognition (CVPR 2018), Jun. 18-22, 2018, Salt Lake City, Utah, 9 pages.

Djuric et al., "Motion Prediction of Traffic Actors for Autonomous Driving using Deep Convolutional Networks", arXiv:1808.05819v2, Sep. 16, 2018, 7 pages.

Engelcke et al., "Vote3Deep: Fast Object Detection in 3D Point Clouds Using Efficient Convolutional Neural Networks", arXiv:1609.06666v2, Mar. 5, 2017, 7 pages.

Girshick, "Fast R-CNN", 2015 IEEE International Conference on Computer Vision (ICCV), Dec. 7-13, 2015, Santiago, Chile, pp. 1440-1448.

Gupta et al., "Social GAN: Socially Acceptable Trajectories with Generative Adversarial Networks", IEEE/CVF Conference on Computer Vision and Pattern Recognition (CVPR 2018), Jun. 18-22, 2018, Salt Lake City, Utah, pp. 2255-2264.

He et al., "Deep Residual Learning for Image Recognition", IEEE/Computer Society Conference on Computer Vision and Pattern Recognition (CVPR 2016), Jun. 26-Jul. 1, 2016, Las Vegas, NV, pp. 770-778.

He et al., "Mask R-CNN", 2017 IEEE International Conference on Computer Vision (ICCV), Oct. 22-29, 2017, Venice, Italy, pp. 2961-2969.

Hu et al., "Probabilistic Prediction of Vehicle Semantic Intention and Motion", arXiv:1804.03629v1, Apr. 10, 2018, 7 pages.

Kim et al., "Probabilistic Vehicle Trajectory Prediction Over Occupancy Grid Map via Recurrent Neural Network", arXiv:1704.02049v2, Sep. 1, 2017, 6 pages.

Kingma et al., "Adam: A Method for a Stochastic Optimization", arXiv:1412.6980v8, Jul. 23, 2015, 15 pages.

Kipf et al., "Neural Relational Inference for Interacting Systems", arXiv:1802.04687v2, Jun. 6, 2018, 17 pages.

Ku et al., "Joint 3D Proposal Generation and Object Detection from View Aggregation", arXiv:1712.02294v4, Jul. 12, 2018, 8 pages.

Lee et al., "DESIRE: Distant Future Prediction in Dynamic Scenes with Interacting Agents", IEEE Computer Society Conference on Computer Vision and Pattern Recognition (CVPR 2017), Jul. 21-26, 2017, Honolulu, HI, pp. 336-345.

Li et al., "Situation Recognition with Graph Neural Networks", 2017 IEEE International Conference on Computer Vision (ICCV), Oct. 22-29, 2017, Venice, Italy, pp. 4173-4182.

Li et al., "Stereo R-CNN based 3D Object Detection for Autonomous Driving", IEEE/CVF Conference on Computer Vision and Pattern Recognition (CVPR 2019), Jun. 16-20, 2019, Long Beach, CA, pp. 7644-7652.

Li et al., "Vehicle Detection from 3D Lidar Using Fully Convolutional Network", arXiv:1608.07916v1, Aug. 29, 2016, 8 pages.

Li, "3D Fully Convolutional Network for Vehicle Detection in Point Cloud", arXiv:1611.08069v2, Jan. 16, 2017, 5 pages.

Liang et al., "Deep Continuous Fusion for Multi-Sensor 3D Object Detection", European Conference on Computer Vision, Sep. 8-14, 2018, Munich, Germany, 16 pages.

Liang et al., "Multi-Task Multi-Sensor Fusion for 3D Object Detection", IEEE/CVF Conference on Computer Vision and Pattern Recognition (CVPR 2019), Jun. 16-20, 2019 Long Beach, CA, pp. 7345-7353.

Lin et al,. "Focal Loss for Dense Object Detection", IEEE Computer Society Conference on Computer Vision and Pattern Recognition (CVPR 2017), Jul. 21-26, 2017, Honolulu, HI, pp. 2980-2988.

Lin et al., "Feature Pyramid Networks for Object Detection", IEEE Computer Society Conference on Computer Vision and Pattern Recognition (CVPR 2017), Jul. 21-26, 2017, Honolulu, HI, pp. 2117-2125.

Luo et al., "Fast and Furious: Real Time End-to-End 3d Detection, Tracking and Motion Forecasting With a Single Convolutional Net", IEEE Computer Society Conference on Computer Vision and Pattern Recognition, Jun. 18-22, 2018, Salt Lake City, Utah, 9 pages.

Ma et al., "Arbitrary-Oriented Scene Text Detection via Rotation Proposals", arXvi:1703.01086v3, Mar. 15, 2008, 11 pages.

Ma et al., "Forecasting Interactive Dynamics of Pedestrians With Fictitious Play", IEEE Computer Society Conference on Computer Vision and Pattern Recognition, Jul. 21-26, 2017, Honolulu, HI, 9 pages.

(56) References Cited

OTHER PUBLICATIONS

Ma et al., "TrafficPredict: Trajectory Prediction for Heterogeneous Traffic-Agents", The Thirty-Third AAAI Conference on Artificial Intelligence (AAAI-19), Jan. 27-Feb. 1, 2019, Honolulu, HI, pp. 6120-6127.

McNabb et al., "I'll Show You the Way: Risky Diver Behavior When "Following a Friend"." Frontiers in Psychology, vol. 8, Article 705, May 9, 2017, 6 pages.

Meyer et al., "LaserNet: An Efficient Probabilistic 3D Object Detector for Autonomous Driving", IEEE/CVF Conference on Computer Vision and Pattern Recognition (CVPR 2019), Jun. 16-20, 2019 Long Beach, CA, pp. 12677-12686.

Meyer et al., "Sensor Fusion for Joint 3D Object Detection and Semantic Segmentation", IEEE/CVF Conference on Computer Vision and Pattern Recognition (CVPR 2019), Jun. 16-20, 2019 Long Beach, CA, pp. 41-48.

Qi et al,. "3D Graph Neural Networks for RGBD Semantic Segmentation", 2017 IEEE International Conference on Computer Vision (ICCV), Oct. 22-29, 2017, Venice, Italy, pp. 5199-5208.

Qi et al., "Frustum PointNets for 3D Object Detection from RGB-D Data", IEEE/CVF Conference on Computer Vision and Pattern Recognition (CVPR 2018), Jun. 18-22, 2018, Salt Lake City, Utah, pp. 918-927.

Qi et al., "PointNet: Deep Learning on Point Sets for 3D Classification and Segmentation", IEEE Computer Society Conference on Computer Vision and Pattern Recognition (CVPR 2017), Jul. 21-26, 2017, Honolulu, HI, pp. 652-660.

Qi et al., "PointNet++: Deep Hierarchical Feature Learning on Point Sets in Metric Space", $31^{st}$ Conference on Neural Information Processing Systems, Dec. 4-9, 2017, Long Beach, CA, 10 pages.

Sadeghian et al., "SoPhie: An Attentive GAN for Predicting Paths Compliant to Social and Physical Constraints", IEEE/CVF Conference on Computer Vision and Pattern Recognition (CVPR 2019), Jun. 16-20, 2019, Long Beach, CA, pp. 1349-1358.

Santoro et al., "A simple neural network module for relational reasoning", $31^{st}$ Conference on Neural Information Processing Systems, Dec. 4-9, 2017, Long Beach, CA, pp. 273-283.

Scarselli et al., "The graph neural network", IEEE Transactions on Neural Networks, vol. 20, No. 1, Jan. 2009, pp. 59-80.

Schlichtkrull et al., "Modeling Relational Data with Graph Convolutional Networks", arXiv:1703,06103v4, Oct. 26, 2017, 9 pages.

Shi et al., "PointRCNN: 3D Object Proposal Generation and Detection from Point Cloud", IEEE/CVF Conference on Computer Vision and Pattern Recognition (CVPR 2019), Jun. 16-20, 2019 Long Beach, CA, pp. 770-779.

Simon et al., "Complex-YOLO: An Euler-Region-Proposal for Real-time 3D Object Detection on Point Clouds", arXiv:1803,06199v2, Sep. 24, 2018, 14 pages.

Simonyan et al., "Very Deep Convolutional Networks for Large-Scale Image Recognition", arXiv:1409.1556v5, Dec. 23, 2014, 13 pages.

Soo Park et al., "Egocentric Future Localization" IEEE/Computer Society Conference on Computer Vision and Pattern Recognition (CVPR 2016), Jun. 26-Jul. 1, 2016, Las Vegas, NV, pp. 4697-4705.

Sun et al., "Actor-Centric Relation Network", European Conference on Computer Vision, Sep. 8-14, 2018, Munich, Germany, 17 pages.

Sun et al., "Courteous Autonomous Cars", arXiv:1808.02633, Aug. 16, 2018, 9 pages.

Sun et al., "Relational Action Forecasting", IEEE/CVF Conference on Computer Vision and Pattern Recognition (CVPR 2019), Jun. 16-20, 2019, Long Beach, CA, pp. 273-283 pages.

Vaswani et al., "Attention Is All You Need", $31^{st}$ Conference on Neural Information Processing Systems, Dec. 4-9, 2017, Long Beach, CA, 15 pages.

Wang et al., "Deep Parametric Continuous Convolutional Neural Networks", IEEE/CVF Conference on Computer Vision and Pattern Recognition (CVPR 2018), Jun. 18-22, 2018, Salt Lake City, Utah, pp. 2589-2597.

Weiss et al., "Correctness of belief propagation in Gaussian graphical models of arbitrary topology", Neural Information Processing Systems 2000, Nov. 27-Dec. 2, 2000, Denver, CO, pp. 673-679.

Wilde, "Social Interaction Patterns in Driver Behavior: An Introductory Review" Human Factors: The Journal of the Human Factors and Ergonomics Society, vol. 11, No. 5, Oct. 1976, pp. 477-492.

Yang et al., "HDNET: Exploiting HD Maps for 3D Object Detection", $2^{nd}$ Conference on Robot Learning, Oct. 29-31, 2018, Zurich, Switzerland, 10 pages.

Yang et al., "PIXOR: Real-Time 3D Object Detection From Point Clouds", IEEE/CVF Conference on Computer Vision and Pattern Recognition (CVPR 2018), Jun. 18-22, 2018 Salt Lake City, Utah, pp. 7652-7660.

Yi et al., "Pedestrian Behavior Understanding and Prediction with Deep Neural Networks", European Conference on Computer Vision, Oct. 8-16, 2016, Amsterdam, The Netherlands, pp. 263-279.

Zeng et al., "End-to-end Interpretable Neural Motion Planner", IEEE/CVF Conference on Computer Vision and Pattern Recognition (CVPR 2019), Jun. 16-20, 2019, Long Beach, CA, 10 pages.

Zhou et al., "VoxelNet: End-to-End Learning for Point Cloud Based 3D Object Detection", IEEE/CVF Conference on Computer Vision and Pattern Recognition (CVPR 2018), Jun. 18-22, 2018, Salt Lake City, Utah, 10 pages.

Ziegler et al., "Making Bertha Drive—An Autonomous Journey on a Historic Route", IEEE Intelligent Transportation Systems Magazine, vol. 6, No. 2, 2014, pp. 8-20.

* cited by examiner

SYSTEMS AND METHODS FOR GENERATING MOTION FORECAST DATA FOR A PLURALITY OF ACTORS WITH RESPECT TO AN AUTONOMOUS VEHICLE

CROSS REFERENCE TO RELATED APPLICATION

The present application claims filing benefit of U.S. Provisional Patent Application Ser. No. 62/871,436 having a filing date of Jul. 8, 2019, which is incorporated herein by reference in its entirety, claims filing benefit of U.S. Provisional Patent Application Ser. No. 62/930,620 having a filing date of Nov. 5, 2019, which is incorporated herein by reference in its entirety.

FIELD

The present disclosure relates generally to controlling vehicles. In particular, the present disclosure is directed to systems and methods for generating motion forecast data for a plurality of actors with respect to an autonomous vehicle

BACKGROUND

Autonomous vehicles can be capable of sensing their environments and navigating with little to no human input. In particular, an autonomous vehicle can observe its surrounding environment using a variety of sensors and can attempt to comprehend the environment by performing various processing techniques on data collected by the sensors. Some vehicles can predict or project future circumstances based on current observations. However, the interactions between various third party actors can be complex and difficult to model.

SUMMARY

Aspects and advantages of embodiments of the present disclosure will be set forth in part in the following description, or may be learned from the description, or may be learned through practice of the embodiments.

Aspects of the present disclosure are directed to a computing system including an object detection model configured to receive an input representation that describes sensor data, and in response to receipt of the input representation that describes the sensor data, output object detection data describing features of a plurality of actors relative to an autonomous vehicle. The computing system can include an interaction model configured to receive an input sequence that describes the object detection data, and in response to receipt of the input sequence, generate an attention embedding with respect to the plurality of actors. The computing system can include a recurrent model configured to receive the attention embedding, and in response to receipt of the attention embedding, generate motion forecast data with respect to the plurality of actors, the motion forecast data describing respective trajectories for the plurality of actors. The computing system can include a memory that stores a set of instructions and one or more processors which use the set of instructions to perform operations. The operations can include inputting the input representation that describes the sensor data into the object detection model and receiving, as an output of the object detection model, the object detection data describing the features of the plurality of the actors relative to the autonomous vehicle. The operations can include generating an input sequence that describes the object detection data; analyzing the input sequence using an interaction model to produce, as an output of the interaction model, the attention embedding; inputting the attention embedding into the recurrent model; and determining respective trajectories for the plurality of actors based on motion forecast data received as an output of the recurrent model.

Another aspect of the present disclosure is directed to a computer-implement method for forecasting actor motion. The method can include inputting, by a computing system comprising one or more computing devices, an input representation that describes sensor data into an object detection model that is configured to receive the input representation that describes the sensor data, and in response to receipt of the input representation that describes the sensor data, output object detection data describing features of a plurality of actors relative to an autonomous vehicle. The method can include receiving, by the computing system and as an output of the object detection model. The object detection data can describe the features of the plurality of the actors relative to the autonomous vehicle. The method can include generating an input sequence that describes the object detection data; analyzing the input sequence using an interaction model to produce, as an output of the interaction model, the attention embedding; inputting the attention embedding into the recurrent model; and determining respective trajectories for the plurality of actors based on motion forecast data received as an output of the recurrent model.

Another aspect of the present disclosure is directed to a computer-implement method for training one or more machine-learned systems. The method can include inputting, by a computing system comprising one or more computing devices, an input representation that describes sensor data into an object detection model that is configured to receive the input representation that describes the sensor data, and in response to receipt of the input representation that describes the sensor data, output object detection data describing features of a plurality of actors relative to an autonomous vehicle. The method can include receiving, by the computing system and as an output of the object detection model, the object detection data describing the features of the plurality of the actors relative to the autonomous vehicle. The method can include generating an input sequence that describes the object detection data; analyzing the input sequence using an interaction model to produce, as an output of the interaction model, the attention embedding; inputting the attention embedding into the recurrent model; and determining respective trajectories for the plurality of actors based on motion forecast data received as an output of the recurrent model. The method can include updating one or more parameters of at least one of the object detection model, the interaction model, or the recurrent model.

Other example aspects of the present disclosure are directed to systems, methods, vehicles, apparatuses, tangible, non-transitory computer-readable media, and memory devices for controlling autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
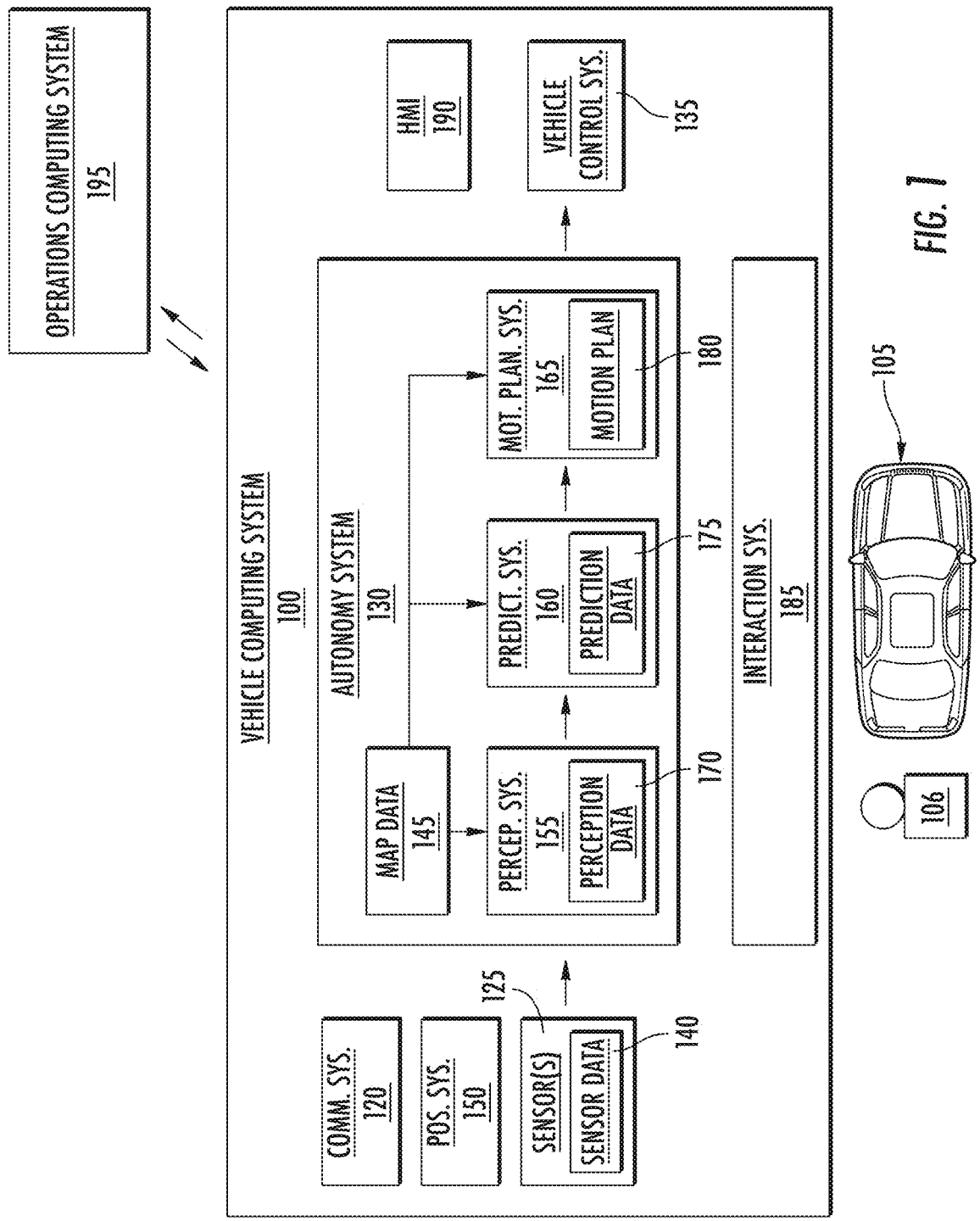
FIG. 1 depicts an example system overview according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods for generating motion forecast data for a plurality of actors with respect to an autonomous vehicle. Interaction between third party actors, such as vehicles, pedestrians, cyclists, and the like can alter how such third parties act. An actor can change its trajectory based on how it predicts another actor will act (e.g., its trajectory). For instance, when multiple vehicles approach a four-way stop, drivers anticipate how each will act to determine when to yield. Similarly, when one vehicle begins changing lanes, other drivers typically project a future trajectory of the vehicle. Other drivers can adjust their own trajectories based on this projection of the vehicles trajectory to prevent unsafe conditions, such as becoming dangerously close with the vehicle. Aspects of the present disclosure are directed to providing systems and method for autonomous vehicles that project third party trajectories of other actors based on anticipated interactions between the actors. Autonomous vehicles can greatly benefit from such systems to better navigate through and integrate into the modern driving environment (e.g., including human-driven vehicles and/or semi-autonomous vehicles).

More particularly, an autonomous vehicle can be a ground-based autonomous vehicle (e.g., car, truck, bus, bike, scooter, etc.) or another type of vehicle (e.g., aerial vehicle, etc.) that can operate with minimal and/or no interaction from a human operator. An autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors, an autonomy computing system (e.g., for determining autonomous navigation), one or more vehicle control systems (e.g., for controlling braking, steering, powertrain, etc.), and/or other systems. The vehicle computing system can obtain sensor data from sensor(s) onboard the vehicle, attempt to comprehend the vehicle's surrounding environment by performing various processing techniques on the sensor data, and generate an appropriate motion plan through the vehicle's surrounding environment.

The vehicle computing system can receive sensor data from one or more sensors that are coupled to or otherwise included within the autonomous vehicle. For example, in some implementations, a perception system can be included within the vehicle computing system and configured to receive the sensor data. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of static objects and/or dynamic objects (actors) within the surrounding environment of the autonomous vehicle. For example, the objects can include traffic signals, additional vehicles, pedestrians, bicyclists, signs (e.g., stop signs, yield signs), and/or other objects. The sensor data can include raw sensor data and/or data that has been processed or manipulated in some manner before being provided to other systems within the autonomy computing system.

In addition to the sensor data, the vehicle computing system (e.g., the perception system) can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data that provides information that assists the vehicle computing system in comprehending and perceiving its surrounding environment and its relationship thereto.

To help forecast data for objects/actors with respect to an autonomous vehicle, the sensor data (e.g., image frames, LIDAR sweeps, or other suitable sensor data) and/or map data can be processed before being input into a machine-learned object detection model. For example, a BEV voxel representation can be generated of LiDAR point clouds. For each sweep, the point cloud can be voxelized into a 3D occupancy grid, for example, with a fixed 3D voxel resolution, centered at the position of the autonomous vehicle (ego car position). The point feature can be defined as 1 to represent occupancy. The voxel feature can be computed by summing all nearby point features weighted by their relative positions to the voxel center. As a result, the voxel representation can implicitly preserve fine-grained information within the voxel. To capture past motion for the task of prediction, multiple past LiDAR sweeps can be aggregated. For example, the voxel representations of the LiDAR sweeps can be concatenating along the Z-axis. Past LiDAR sweeps can be registered to a current frame by ego motion compensation. Ego motion compensation generally refers to compensating for movement of the autonomous vehicle to with respect to sensor data. In this example, movement of the autonomous vehicle can be tracked using one or more tracking data sources (e.g., through image frame, accelerometers, or the like). The LiDAR data can be adjusted, reconciled, aligned, and/or mapped with respect to such tracking data to compensate for movement of the autonomous vehicle.

In some implementations, map data (e.g., geometric and/or semantic map priors) can be exploited for better reasoning. For example, ground height can be subtracted from the Z-value of each LiDAR point before voxelization. As a result, the variation caused by ground slope can be removed. Map data and/or semantic priors in the form of road and lane masks can be extracted. Each semantic prior can be or include a one-channel raster image in BEV depicting the drivable surface and all the lanes respectively. The LiDAR voxel representation can be augmented through concatenation with semantic map priors. The output space of the input representation can be defined in BEV, which can provide for efficient feature sharing between perception and prediction. Thus, the sensor and map data can be processed to generate an input representation that can be input the object detection model.

The object detection model can employ a sensor-fusion backbone network that can include a two-stream architecture. A BEV stream network can be or include a 2D convolutional network that extracts features in BEV space from the input representation (e.g., including joint LiDAR and map representations). Inception-like blocks can be stacked sequentially with residual connections to extract multi-scale feature maps. An image stream network can be or include residual blocks that are pre-trained. For instance, the image stream network can be or include a ResNet-18 model that is pre-trained on an ImageNet data set. The image stream network can be configured to receive camera images as input. Multi-scale image feature maps from each ResNet-18 residual block can be aggregated, for example using a feature pyramid network. The aggregated feature map can be fused with the BEV stream via a continuous fusion layer. Thus, the object detection model can employ a two-stream architecture to detect locations of actors with respect to the autonomous vehicle.

A continuous fusion layer can provide a dense fusion from image space to BEV space through linear interpolation parameterized by a trainable multi-layer perceptron (MLP). More specifically, image features can first be back-projected to BEV space according to the existing LiDAR observation. At BEV locations with no LiDAR points, the image features can be interpolated from nearby occupied locations (e.g., using one or more MLPs). The image feature and BEV feature can be fused together by element-wise addition (assuming same number of feature channels) in BEV space. Thus, the BEV stream of LiDAR data can be fused with camera images to generate the output feature map.

In some implementations, the output feature map can be input into a machine-learned object detection model, and object detection data can be received as an output of the machine-learned object detection model. The object detection data can include multi-sensor features for use in action prediction. For example, as vehicles do not overlap and have relatively similar size in BEV space, object detection can be formulated as dense prediction without introducing any object anchors (e.g., following RetinaNet). Several convolutions (e.g., 1×1) can be applied on top of the BEV feature map, which can output an n-dimensional vector per voxel. Non-maximum suppression (NMS) can be used to remove and/or reduce duplicates.

Aspects of the present disclosure are directed to Recurrent Interactive Motion Forecasting, which can refer to employing recurrent machine-learning models and/or techniques to predict the trajectories of other actors with respect to the autonomous vehicle. Recurrent interaction motion forecasting can provide various benefits. For example, a recurrent interaction motion forecasting can be configured to 1) jointly reason over all actors to capture their interactions and/or 2) iteratively infer each trajectory to capture the sequential nature of the trajectory. This design is informed by the following two observations. First, the behaviors of actors heavily depend on each other. For example, drivers control the vehicle speed to keep a safe distance from the vehicle ahead. At intersections, drivers typically wait for the other drivers that have the right of way. Second, the output trajectory can be considered to have a Markovian temporal dependency. That is, the output at each time step depends on the outputs at previous time steps. Thus, recurrent interaction motion forecasting, as described herein can provide various benefits.

Recurrent interaction motion forecasting, as described herein, can have an interaction transformer configuration. A transformer configuration generally refers to a sequence-to-sequence model with an encoder-decoder configuration or architecture. More specifically, an interaction model can include an attention model and a context aggregation model (e.g., in an encoder-decoder configuration). An input sequence can be generated that describes the object detection data. For example, the interaction model can generate the input sequence by projecting each feature of the object detection data to a query and a pair of keys and values, which can each be or include respective vectors. The input sequence can be analyzed using the attention model to generate attentional weights. For example, the input sequence can be input into the attention model and attentional weights can be received as an output of the attention model. The interaction model can generate an attention embedding with respect to the plurality of actors in response to receipt of the attentional weights. Lastly, a recurrent model can be configured to receive the attention embedding, and in response to receipt of the attention embedding, generate motion forecast data with respect to the plurality of actors.

This configuration can be used to draw global dependencies between input and output, especially for long sequences. For each query associated with the input representation, the recurrent interaction motion forecasting model can compute a set of attentional weights using a compatibility function between the query and the set of keys. The output feature can be the sum of values weighted by the attentional weights and optionally including nonlinear transformations.

As indicated above, the object detection data can correspond with a set of actors and their representations. The state of each actor can be represented with features extracted from the BEV feature map as well as the actor location, which can simply be the x- and y-coordinates of the actor center. Information about object size and orientation can be encoded in the object detection data and thus does not have to be explicitly encoded in the actor representation.

In some implementations, relative distances and orientations can be employed as absolute location provides little information about the interactions between actors. At each time step, an interaction transformer can update the states of all actors and then predict the next waypoint of the trajectory for each actor. Instead of encoding location as absolute positional embeddings (which can be fused into the input features), a relative location embedding can be employed with respect to the keys, values, and queries. The attention embedding can be calculated based on relative location embedding, the keys, values, and queries.

Aspects of the present disclosure are directed to training one or more machine-learned system for generating motion forecast data for a plurality of actors with respect to an autonomous vehicle. The method can include generating motion forecast data, for example as described above. One or more parameters of the object detection model, the interaction model, and the recurrent model, for example through repeated training iterations. In some implementations, two or more models can be trained in an end-to-end configuration. For example, errors can be sequentially back-propagated through each of the object detection model, the interaction model, and the recurrent model to evaluate a joint loss function. A gradient of the joint loss function can be calculated to adjust the parameter(s) to reduce the joint loss function to jointly train the models.

More specifically, the model(s) can be fully differentiable and thus can be trainable end-to-end through back-propagation. The sum of a detection loss of the object detection model and a prediction loss of the interaction and/or recurrent model can be minimized. For example, an overall loss function can be a sum of respective losses for object classification, detection box regression, and future motion regression. In particular, binary cross entropy can be used as classification loss, and smooth L1 loss on each dimension of the detection box and its future motion. L1 loss generally refers to mean absolute error.

In some implementations, hard negative mining can be employed. For object detection, the distance between BEV voxels and their closest ground-truth box centers can be used to determine positive and negative samples. Samples having distances smaller than a threshold can be considered as positive. Samples having distances larger than the threshold can be considered as negative. As a large proportion of the samples are negative in dense object detection, online hard negative mining can be employed. In some implementations, only the most difficult negative samples (with largest loss) can be kept and easy negative samples can be ignored. Classification loss can be averaged over both positive and negative samples while regression loss can be averaged over positive samples only.

In some implementations, online association can be performed between detection results and ground truth labels to compute prediction loss. For each detection, the ground-truth box can be assigned with the maximum (oriented) intersection of union IoU. If a ground truth box is assigned to multiple detections, only the detection with maximum IoU can be kept while other detections are ignored. Regression on future motion can then be averaged over those detections with the associated ground-truth.

Example aspects of the present disclosure can provide for a number of technical effects and benefits, including improvements to computing systems. The computational time and resources required to accurately predict the trajectories of the third party actors can be reduced. Another example technical effect and benefit can include an improved safety assurance. In some cases, especially cases involving multiple actors and/or decisions, exhaustively testing every possibility can be computationally infeasible. Systems and methods according to the present disclosure can allow for an autonomous vehicle to safely navigate scenes having multiple objects and/or requiring multiple decisions that could otherwise be challenging to navigate effectively while considering the safety of each object and/or decision.

More specifically, employing an interaction model and/or recurrent model as described herein can leverage structures and properties of the models to more effectively predict interactions between third parties. The input sequence can be analyzed using an interaction model to produce an attention embedding. For example, input sequence can be input into the interaction model, and the attention embedding can be received as an output. The attention embedding can be input into the recurrent model. The recurrent model can generate motion forecast data in response to receiving the attention embedding. Respective trajectories for the plurality of actors can be determined based on the motion forecast data. This combination can more accurately efficiently predict actor trajectories. For example, the described configuration can draw global dependencies based on the sequential nature of the input sequence that describes the object detection data. The recurrent interactive motion forecasting described herein 1) jointly reason over all actors to capture their interactions and/or 2) iteratively infer each trajectory to capture the sequential nature of the trajectory. Thus, the systems and methods described herein can reduce computational time and resources required to accurately predict actor trajectories and/or improve safety by quickly and accurately making such predictions.

Various means can be configured to perform the methods and processes described herein. For example, a computing system can include sensor data obtaining unit(s), map data obtaining unit(s), machine-learned object recognition model application unit(s), trajectory/behavior forecasting unit(s), vehicle controlling unit(s), operator communication unit(s), data storing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data from one or more sensors that generate sensor data relative to an autonomous vehicle. In some implementations, the means can be configured to obtain sensor data associated with the autonomous vehicle's surrounding environment as well as the position and movement of the autonomous vehicle. In some implementations, the means can be configured to obtain LIDAR data (e.g., a three-dimensional point cloud) obtained from a LIDAR system. In some implementations, the means can be configured to obtain image data obtained from one or more cameras. In some implementations, the means can be configured to obtain a birds-eye view representation of data obtained relative to the autonomous vehicle. In some implementations, the means can be configured to obtain sensor data represented as a multi-dimensional tensor having a height dimension and a time dimension stacked into a channel dimension associated with the multi-dimensional tensor. A sensor data obtaining unit is one example of a means for obtaining such sensor data as described herein.

The means can be configured to access or otherwise obtain map data associated with a surrounding geographic environment of the autonomous vehicle. More particularly, in some implementations, the means can be configured to access or otherwise obtain map data that provides information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the means can be configured to access or otherwise obtain map data that is provided in a birds-eye view representation, such as generated by rasterization or other suitable processing format. A map data obtaining unit is one example of a means for obtaining such map data as described herein.

The means can be configured to provide, as input to a machine-learned object detection model, data describing the sensor data, and to receive the object detection data as an output of the machine-learned object detection. A machine learned object detection model unit is one example of a means for providing the sensor data and map data as inputs to the machine learned object detection model and receiving multiple outputs therefrom.

The means can be configured to generate motion forecast data that describes or predicts the trajectory/behavior of a plurality of actors with respect to the autonomous vehicle. The trajectory/behavior forecasting unit(s) is one example of a means for providing data output from the machine learned object detection model(s) to the trajectory prediction model(s) (e.g., including the interaction model and/or recurrent model and receiving multiple outputs therefrom).

The means can be configured to determine a motion plan for the autonomous vehicle based at least in part on the motion forecast data. The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning unit is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit is one example of a means for controlling motion of the autonomous vehicle to execute the motion plan.

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. The vehicle 105 can be an autonomous vehicle. For instance, the vehicle 105 can be a ground-based autonomous vehicle such as an autonomous car, autonomous truck, autonomous bus, etc. The vehicle 105 can be an air-based autonomous vehicle (e.g., airplane, helicopter, or other aircraft) or other types of vehicles (e.g., watercraft, etc.). The vehicle 105 can drive, navigate, operate, etc. with minimal and/or no interaction from a human operator 106 (e.g., driver). An operator 106 (also referred to as a vehicle operator) can be included in the vehicle 105 and/or remote from the vehicle 105. In some implementations, the vehicle 105 can be a non-autonomous vehicle.

In some implementations, the vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator of the vehicle 105. For example, a collision mitigation system can utilize a predicted intention of objects within the vehicle's 105 surrounding environment to assist an operator 106 in avoiding collisions and/or delays even when in manual mode.

The operating modes of the vehicle 105 can be stored in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 100 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. For example, in some implementations, the remote computing system can be an operations computing system 195, as disclosed herein. By way of example, such data communicated to a vehicle 105 by the operations computing system 195 can instruct the vehicle 105 to enter into the fully autonomous operating mode. In some implementations, the operating mode of the vehicle 105 can be set onboard and/or near the vehicle 105. For example, the vehicle computing system 100 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for determining object intentions based on physical attributes.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). In some implementations, the communications system 120 can allow communication among one or more of the system(s) on-board the vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the vehicle 105. For instance, the sensor data 140 can include image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The vehicle 105 can also include other sensors configured to acquire data associated with the vehicle 105. For example, the vehicle 105 can include inertial measurement unit(s), wheel odometry devices, and/or other sensors.

In some implementations, the sensor data 140 can be indicative of one or more objects within the surrounding environment of the vehicle 105. The object(s) can include, for example, vehicles, pedestrians, bicycles, and/or other objects. The object(s) can be located in front of, to the rear of, to the side of the vehicle 105, etc. The sensor data 140 can be indicative of locations associated with the object(s) within the surrounding environment of the vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the vehicle 105. In some implementations, the vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 105 in comprehending and perceiving its surrounding environment and its relationship thereto. In some implementations, the vehicle computing system 100 can determine a vehicle route for the vehicle 105 based at least in part on the map data 145.

The vehicle 105 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system. For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160, the motion planning system 165, the interaction system 185, and/or other system(s).

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. In some implementations, the prediction data 175 can include a predicted object intention (e.g., a right turn) based on physical attributes of the object. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), intention, other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 X degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

As shown in FIG. 1, the vehicle 105 can include an HMI (Human Machine Interface) 190 that can output data and accept input from the operator 106 of the vehicle 105. For instance, the HMI 190 can include one or more output devices (e.g., speakers, display devices, tactile devices, etc.) such that, in some implementations, the HMI 190 can provide one or more informational prompts to the operator 106 of the vehicle 105. For example, the HMI 190 can be configured to provide prediction data 170 such as a predicted object intention to one or more vehicle operator(s) 106. Additionally, or alternatively, the HMI 190 can include one or more input devices (e.g., buttons, microphones, cameras, etc.) to accept vehicle operator 106 input. In this manner, the HMI 190 can communicate with the vehicle operator 106.

The vehicle computing system 100 can include an interaction system 185. As illustrated in FIG. 1, the interaction system 185 can be implemented onboard the vehicle 105 (e.g., as a portion of the vehicle computing system 100). Moreover, in some implementations, the interaction system 185 can be remote from the vehicle 105 (e.g., as a portion of an operations computing system 195). The interaction system 185 can determine one or more object intention(s) associated with objects within the surrounding environment of the vehicle 105, as described in greater detail herein. In some implementations, the interaction system 185 can be configured to operate in conjunction with the vehicle autonomy system 130. For example, the interaction system 185 can send data to and receive data from the vehicle autonomy system 130. In some implementations, the interaction system 185 can be included in or otherwise a part of a vehicle autonomy system 130. The interaction system 185 can include software and hardware configured to provide the functionality described herein. In some implementations, the interaction system 185 can be implemented as a subsystem of a vehicle computing system 100. Additionally, or alternatively, the interaction system 185 can be implemented via one or more computing devices that are remote from the vehicle 105. Example interaction system 185 configurations according to example aspects of the present disclosure are discussed in greater detail with respect to FIGS. 2-6.

The operator 106 can be associated with the vehicle 105 to take manual control of the vehicle, if necessary. For instance, in a testing scenario, a vehicle 105 can be periodically tested with controlled faults that can be injected into an autonomous vehicle's autonomy system 130. This can help the vehicle's response to certain scenarios. A vehicle operator 106 can be located within the vehicle 105 and/or remote from the vehicle 105 to take control of the vehicle 105 (e.g., in the event the fault results in the vehicle exiting from a fully autonomous mode in the testing environment).

Although many examples are described herein with respect to autonomous vehicles, the disclosed technology is not limited to autonomous vehicles. For instance, any vehicle may utilize the technology described herein for determining object intention. For example, a non-autonomous vehicle may utilize aspects of the present disclosure to determine the intention of one or more objects (e.g., vehicles, bicycles, etc.) proximate to a non-autonomous vehicle. Such information may be utilized by a non-autonomous vehicle, for example, to provide informational notifications to an operator of the non-autonomous vehicle. For instance, the non-autonomous vehicle can notify or otherwise warn the operator of the non-autonomous vehicle based on a determined object intention. Additionally, or alternatively, the disclosed technology can be implemented and utilized by other computing systems such as other robotic computing systems.

Figure 2:
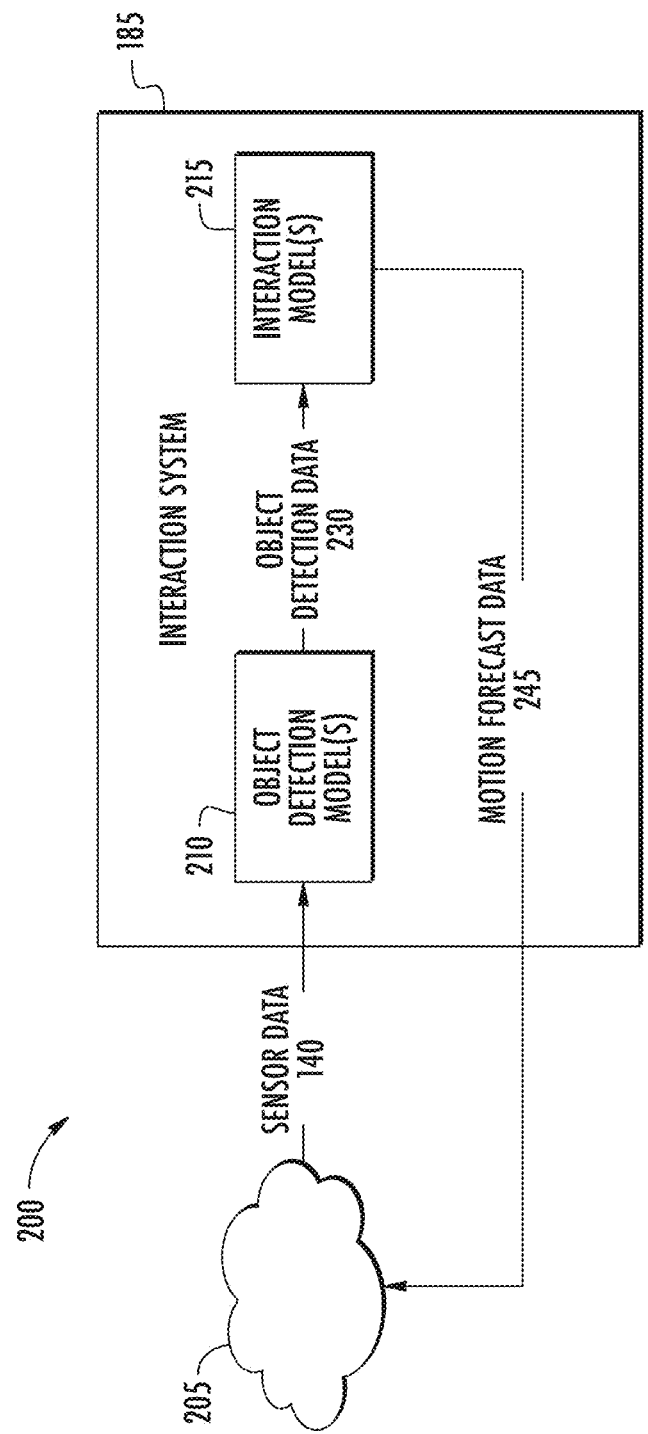
FIG. 2 depicts an example data flow diagram of an example third party trajectory system according to example implementations of the present disclosure.

FIG. 2 depicts an example data flow diagram 200 of an example interaction system 185 according to example implementations of the present disclosure. To facilitate the determination of an object intention associated with an object of interest (e.g., a vehicle proximate to a first vehicle) the interaction system 185 can obtain sensor data 140 via network 205. As described above with reference to FIG. 1, the sensor data 140 can include any data associated with the surrounding environment of the vehicle 105 such as, for example, camera image data and/or Light Detection and Ranging (LIDAR) data. For example, in some implementations, the sensor data 140 can include a sequence of image frames at each of a plurality of time steps. For example, the sequence of image frames can be captured in forward-facing video on one or more platforms of vehicle 105.

In some implementations, the sensor data 140 can be captured via the sensor(s) 125 and transmitted to the interaction system 185 via network 205. For example, the sensor(s) 125 can be communicatively connected to the interaction system 185. In some implementations, the sensor data 140 can be captured by one or more remote computing devices (e.g., operation computing system 195) located remotely from the vehicle computing system 100. For example, the interaction system 185 can be communicatively connected to one or more sensors associated with another vehicle and/or the operations computing system 195. In such a case, the interaction system 185 can obtain the sensor data 140, via network 205, from the one or more remote computing devices and/or operations computing system 195.

The sensor data 140 can be associated with a surrounding environment of the vehicle 105. More particularly, the sensor data 140 can describe one or more objects of interest within the surrounding environment of the vehicle 105. The one or more object(s) of interest can include any moveable object within a threshold distance from the vehicle 105. In some implementations, the threshold distance can include a predetermined distance (e.g., the detection range of sensor(s) 125). Additionally, or alternatively, the interaction system 185 can dynamically determine the threshold distance based on one or more factors such as weather, roadway conditions, environment, etc. For example, the one or more factor(s) can indicate a potentially hazardous situation (e.g., heavy rain, construction, etc.). In such a case, the interaction system 185 can determine a larger threshold distance to increase safety.

In some implementations, the one or more object(s) of interest can include one or more vehicle(s) of interest. The vehicle(s) of interest can include, for example, any motorized object (e.g., motorcycles, automobiles, etc.). The vehicle(s) of interest (e.g., autonomous vehicles, non-autonomous vehicles, etc.) can be equipped with specific hardware to facilitate intent-related communication. For example, the one or more vehicle(s) of interest can include one or more signal light(s) (e.g., turn signals, hazard lights, etc.) to signal the vehicle's intention. The vehicle intention, for example, can include future actions such as lane changes, parking, and/or one or more turns. For instance, a vehicle can signal its intention to stay in a parked position by simultaneously toggling two turn signals on/off in a blinking pattern (e.g., by turning on its hazard lights). In other scenarios, a vehicle can signal its intention to turn by toggling a single turn signal on/off.

The interaction system 185 can include one or more object detection models 210 configured to receive the sensor data 140, and in response to receipt of the sensor data 140, output object detection data 230 describing locations of a plurality of actors (e.g., vehicles, pedestrians, cyclists, etc.) relative to the autonomous vehicle 105 (FIG. 1). In some embodiments, the object detection models 210 can include models that are separate and distinct from other systems described above with reference to FIG. 1. However, it should be understood that the object detection model(s) 210 can be partially or completely included and/or integrated in one or more of the position system 150, perception system 115, prediction system 160, and/or motion planning system 165 described above with reference to FIG. 1.

Figure 3A:
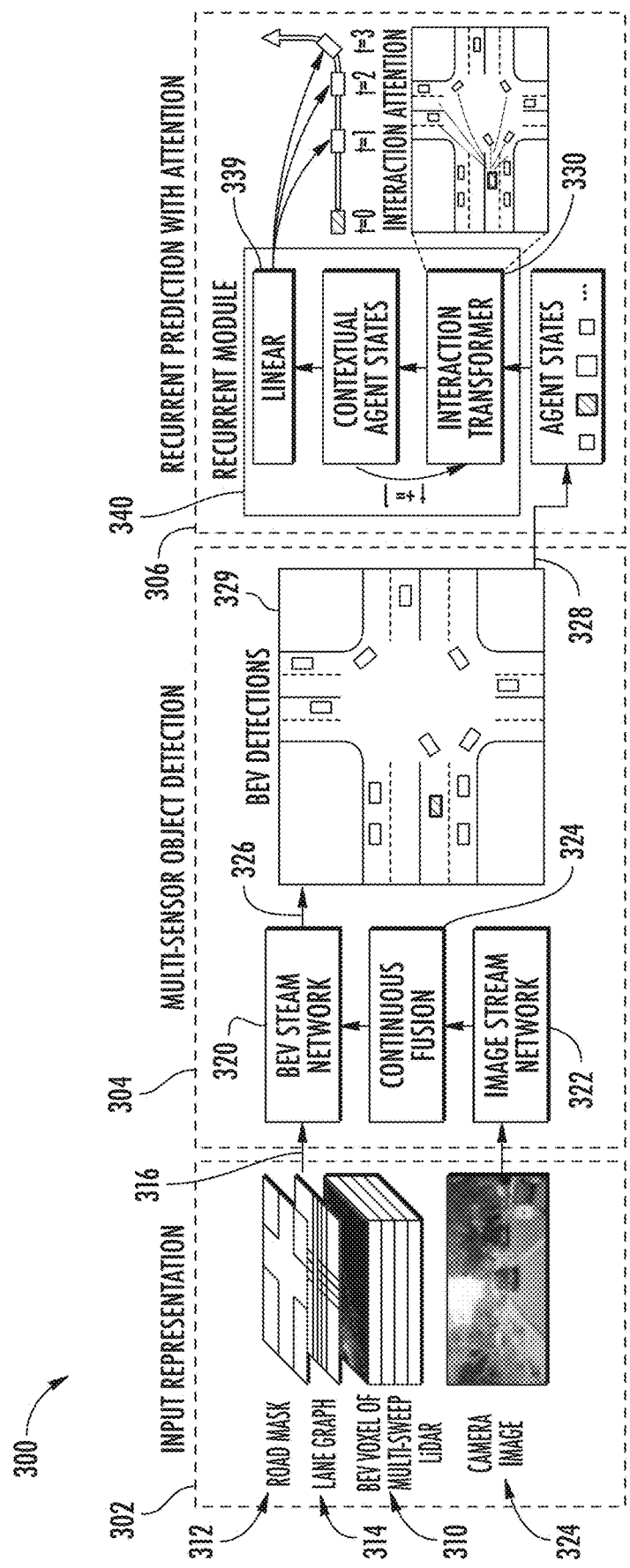
FIG. 3A illustrates a simplified flow chart of an example implementation of a method for generating motion forecast data for a plurality of actors with respect to an autonomous vehicle.
Figure 3B:
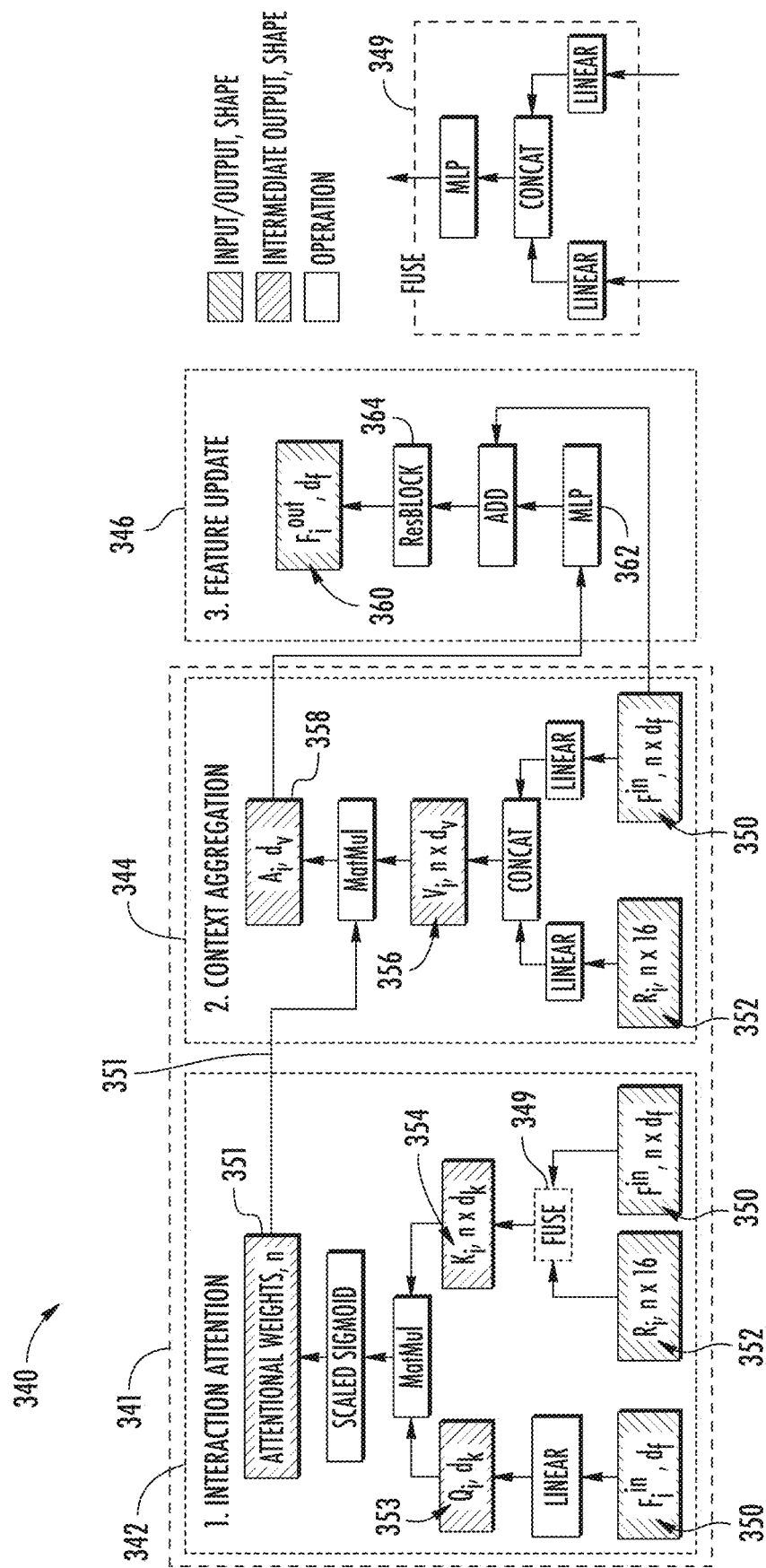
FIG. 3B is a schematic illustration of the recurrent interaction motion forecasting model of FIG. 3A.

FIG. 3A illustrates a simplified flow chart of an example implementation of a method 300 for generating motion forecast data for a plurality of actors with respect to an autonomous vehicle. The method 300 can generally include input data processing 302, object detection 304, and action prediction 306. Action prediction 306 can employ a recurrent interaction motion forecasting model 340. FIG. 3B is a schematic illustration of the recurrent interaction motion forecasting model 340 of FIG. 3A.

Referring to FIG. 3A, the input data processing 302 can include generating a birds-eye-view (BEV) voxel representation 310 of sensor data 140 (FIGS. 1 and 2), such as LiDAR point clouds. For example, a LIDAR sweep point cloud can be voxelized into a 3D occupancy grid with a fixed 3D voxel resolution, which can be centered at the position of the autonomous vehicle (ego car position). The point feature can be defined as 1 to represent occupancy. The birds-eye-view (BEV) voxel representation 310 can be computed by summing all nearby point features weighted by their relative positions to the voxel center. As a result, the voxel representation 310 can implicitly preserve fine-grained information within the voxel. In order to capture past motion for the task of prediction, multiple past LiDAR sweeps can be aggregated by concatenating their voxel representations along the Z-axis. The past LiDAR sweeps can be registered to current frame by ego motion compensation. Ego motion compensation generally refers to compensating for movement of the autonomous vehicle to with respect to sensor data. In this example, movement of the autonomous vehicle can be tracked using one or more tracking data sources (e.g., through image frame, accelerometers, or the like). The LiDAR data can be adjusted, reconciled, aligned, and/or mapped with respect to such tracking data to compensate for movement of the autonomous vehicle.

In some implementations, map data (e.g., geometric and/or semantic map priors) can be exploited for better reasoning. For example, ground height can be subtracted from the Z value of each LiDAR point before voxelization. This approach can remove the variation caused by ground slope. Semantic priors can also be extracted in the form of road masks 312 and lane masks 314. Each of them can be a one-channel raster image in BEV depicting the drivable surface and lanes, respectively. The voxel representations 310 can be augmented with semantic map priors 312, 314 by concatenation to generate an input representation 316.

Object detection 304 can be performed on the input representation 316. The output space of the input representation 316 can be defined in BEV, which can provide for efficient feature sharing between perception and prediction. The detection can be parameterized as a set of oriented bounding boxes. A detection box can be denoted as $(x_i, y_i, w_i, l_i, \theta_i)$, where $x_i$ and $y_i$ represent the box center, $(w_i, l_i)$ represent box size, and $\theta_i$ represents the orientation. Note that the missing Z dimension can be recovered from the ground prior in the HD map. Additionally, the trajectory can be represented as a sequence of boxes at future T time steps, denoted as $\{(x_i^{(t)}, y_i^{(t)}, \theta_i^{(t)})\}$, where t=1, . . . , T. The objects can be assumed to be rigid, and thus their sizes can be kept the same across all time steps.

Object detection 304 can employ a sensor-fusion backbone network including a two-stream architecture. A BEV stream network 320 can be or include a 2D convolutional network that extracts features in BEV space from the input representation 316 (e.g., including joint LiDAR and map representations). Inception-like blocks can be stacked sequentially with residual connections to extract multi-scale feature maps. An image stream network 322 can be or include residual blocks that are pre-trained. For instance, the image stream network 322 can be or include a ResNet-18 model that is pre-trained on an ImageNet data set. The image stream network 322 can be configured to receive camera images 324 as input. Multi-scale image feature maps from each ResNet-18 residual block can be aggregated, for example using a feature pyramid network. The aggregated feature map can be fused with the BEV stream via a continuous fusion layer 324. Thus, object detection 304 can employ a two-stream architecture to detect locations of actors with respect to the autonomous vehicle.

Compared with direct feature projection, the continuous fusion layer 324 can provide a dense fusion from image space to BEV space through linear interpolation parameterized by a trainable multi-layer perceptron MLP. More specifically, image features can first be back-projected to BEV space according to the existing LiDAR observation. At BEV locations with no LiDAR point, the image features can be interpolated from nearby occupied locations (e.g., using one or more MLPs). The image feature and BEV feature can be fused together, at 324, by element-wise addition (assuming same number of feature channels) in BEV space. Thus, the BEV stream of LiDAR data can be fused with camera images to generate an output feature map 326.

The output feature map 326 can be input into a machine-learned object detection model 329 (e.g., including a neural network), and object detection data 328 can be received as an output of the machine-learned object detection model 329. The object detection data 328 can include multi-sensor features for use in action prediction 306. More specifically, as vehicles do not overlap and have relatively similar size in BEV space, object detection 329 can be formulated as dense prediction without introducing any object anchors (e.g., following RetinaNet). Several convolutions (e.g., 1×1) can be applied on top of the output feature map 326, which can output an n-dimensional vector per voxel at last, representing a confidence score, s, and a bounding box parameterized as (dx, dy, w, l, sin 2θ, cos 2θ), where (dx, dy) represent the relative position offset from the voxel center to the box center; (w, l) is the box size; and (sin 2θ, cos 2θ) is used to decode the orientation. The object orientation θ can be estimated by (sin 2θ, cos 2θ) as it yields better results in practice. Oriented non-maximum suppression (NMS) can be applied to remove the duplicates. All remaining boxes having respective scores above a threshold can be kept as final detections.

Aspects of the present disclosure are directed to Recurrent Interactive Motion Forecasting, which can refer to employing recurrent machine-learning models and/or techniques to predict the trajectories of other actors with respect to the autonomous vehicle. Recurrent interaction motion forecasting can provide various benefits. For example, recurrent interaction motion forecasting can 1) jointly reason over all actors to capture their interactions and/or 2) iteratively infer each trajectory to capture the sequential nature of the trajectory. This can allow for the disclosed technology to account for the consideration that the behaviors of actors can heavily depend on each other. For example, a vehicle can modulate speed to maintain a safe distance from the vehicle ahead. In another example, vehicles typically wait for the other vehicles that have the right of way at intersections. Additionally, the recurrent interaction motion forecasting can consider the output trajectory to have a Markovian temporal dependency. That is, the output at each time step depends on the outputs at previous time steps. Thus, recurrent interaction motion forecasting, as described herein can provide various benefits.

FIG. 3B is a schematic illustration of the recurrent interaction motion forecasting model 340 of FIG. 3A Recurrent interaction motion forecasting, as described herein, can have an interaction transformer configuration. A transformer configuration generally refers to a sequence-to-sequence model with an encoder-decoder configuration or architecture. More specifically, an interaction model 341 can include an attention model 342 and a context aggregation model 344 (e.g., in an encoder-decoder configuration). An input sequence 350 can be generated that describes the object detection data. For example, the interaction model 341 can generate the input sequence 350 by projecting each feature of the object detection data to a query and a pair of keys and values, which can each be or include respective vectors. The input sequence 350 can be analyzed using the attention model 342 to generate attentional weights 351. For example, the input sequence 350 can be input into the attention model 342. The attentional weights 351 can be received as an output of the attention model 342. The interaction model 341 can generate an attention embedding 358 with respect to the plurality of actors in response to receipt of the attentional weights 351. Lastly, a recurrent model 346 can be configured to receive the attention embedding 358, and in response to receipt of the attention embedding 358, generate motion forecast data 245 (e.g., included in output features 360) with respect to the plurality of actors.

This configuration can be used to draw global dependencies between input and output, especially for long sequences. More specifically, the interaction model 341 can project each feature to a query 353 and a pair of key 354 and value 356, which can all be or include vectors. For each query 353, the interaction model 341 can compute a set of attentional weights 351 using a compatibility function between the query 353 and the set of keys 356. The output feature can be the sum of values 356 weighted by the attentional weights 351, plus some nonlinear transformations.

More formally, the input sequence, $F^{in}$ (350) can be denoted as:

$$F^{in} \in \mathbb{R}^{n \times d_j}$$

where each row is a feature vector. The interaction model 341 can use linear projections to get the set of queries 353, keys, 354, and values 356 as follows:

$$Q = F^{in}W^Q, \; K = F^{in}W^K, \; V = F^{in}W^V \tag{1}$$

where each of the following are matrices of weights:

$$W^Q \in \mathbb{R}^{d_j \times d_k}$$

$$W^K \in \mathbb{R}^{d_j \times d_k}$$

$$W^V \in \mathbb{R}^{d_j \times d_v}$$

The scaled dot products between the queries 353 and keys 354 can be used to compute the attentional weights 351. The values for each query 353 can then be aggregated:

$$A = \text{softmax}\left(\frac{QK^T}{\sqrt{d_k}}\right)V \tag{2}$$

where a softmax function can be used to add a sum-to-one normalization to the attentional weights 351 of a query 353 (each row of $QK^T$). The scaling factor $$\frac{1}{\sqrt{d_k}}$$

can be used to prevent the dot product from being numerically too large. Finally, Transformer can use a set of nonlinear transformations with shortcut connections to perform feature updates with the recurrent model 346 to produce output features, $F^{out}$, 360:

$$F^{out} = \text{ResBlock}(\text{MLP}(A) + F_{in}) \tag{3}$$

where MLP 362 denotes a Multi-Layer Perceptron which can be applied to each row of A; ResBlock 364 denotes a residual block and can also be applied on each row, and $F^{out}$ (360) has the same shape as $F^{in}$ (350).

As indicated above, the input can correspond with a set of actors and their representations. The state of each actor can be represented with features extracted from the BEV feature map as well as the actor location, which can simply be, for example, the x and y coordinates of the actor center. Information about object size and orientation can be encoded in the feature map and thus may not be explicitly encoded in the actor representation.

To capture the sequential nature of the trajectory outputs, the recurrent interaction motion forecasting model 340 can be used to predict the motion in an auto-regressive way. At each time step, an interaction transformer 330 can be used to update the states of all actors and then predict the next waypoint of the trajectory for each.

More specifically, an actor features matrix, $F^{in}$ (350), can be defined where each row is a feature vector of a respective actor. Equation (1), above, can be used to compute the queries 353. Instead of encoding location as absolute positional embeddings (which can be fused into the input features), a relative location embedding 352 can be employed:

$$R_{ij} = \text{MLP}(\log|x_i - x_j|, \log|y_i - y_j|, \text{sgn}(x_i - x_j), \text{sgn}(y_i - y_j)) \tag{4}$$

where $R \in \mathbb{R}^{n \times n \times 16}$ can be a 3-dimensional matrix and $(x_i, y_i)$ and $(x_j, y_j)$ are the locations of actor i and j respectively, sgn can be the sign function, and an MLP can be used to transform the 4-dimensional input to the 16-dimensional embedding.

$F^{in}$ and R can be used compute K (354) and V (356). Both K (354) and V (356) can be 3-dimensional matrices:

$$K \in \mathbb{R}^{n \times n \times d_k}$$

$$V \in \mathbb{R}^{n \times n \times d_v}$$

K (354) and V (356) can be computed as follows:

$$K_i = \text{MLP}(\text{Concat}(F^{in}W^{K_1}, R_i W^{K_2}) \tag{5}$$

$$V_i = \text{Concat}(F^{in}W^{V_1}, R_i W^{V_2}) \tag{6}$$

In these two equations, Concat denotes concatenation along the second dimension, and MLP can be applied on each row vector. The attention embedding 358, $A_i$, can be computed as follows:

$$A_i = sigmoid\left(\frac{Q_i K_i^T}{\sqrt{d_k}}\right) V_i \qquad (7)$$

Note the softmax function from Equation (2) can be changed to a sigmoid function. Further, removing the sum-to-one constraint can lead to better performance in this task.

Finally, the output features, $F_i^{out}$ (360), can be computed using Equation (3), above. More specifically, the attention embedding 358 can be input into the recurrent model 346. Output features 360 that can include motion forecast data can be received as an output of the recurrent model 346. The motion forecast data can describe respective trajectories for the plurality of actors.

To capture the sequential nature of the trajectory outputs, at each time step, the interaction transformer 330 (FIG. 3A) can update the states of all actors and then predict the next waypoint of the trajectory for each actor. The actor features at time step can be denoted as F(t). F(t) and $\{(x_i^{(t)}, y_i^{(t)})\}$ can be input into the interaction transformer 330 and its output, $F^{out}$ (358), can be set to be $F^{(t+1)}$. When t=0, $(x_i^{(t)}, y_i^{(t)})$ can be set as the detection box center, and $F_i^{(t)}$ set as the bi-linearly interpolated output BEV features extracted at the detection box centers. After the agent feature update, a linear layer 339 can be used to get the one-step prediction output:

$$(x_i^{(t+1)}, y_i^{(t+1)}, \sin 2\theta_x^{(t+1)}, \cos 2\theta_x^{(t+1)}) = F_x^{(t+1)} W^{pred} \qquad (8)$$

where $x_i^{(t+1)}, y_i^{(t+1)}$ are relative to the detection box center at t=0.

Figure 4:
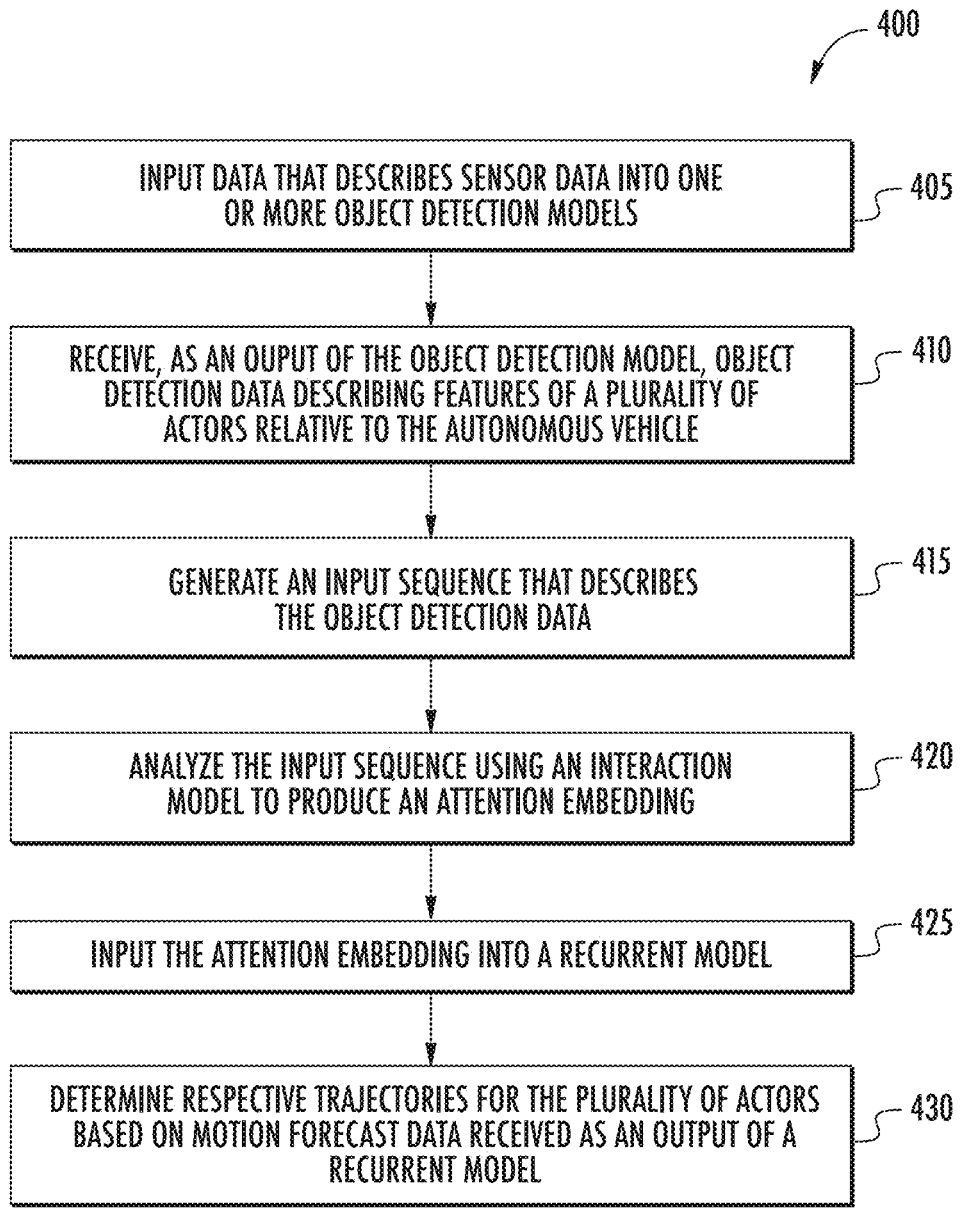
FIG. 4 depicts an example flow diagram of an example method for generating motion forecast data for a plurality of actors with respect to an autonomous vehicle.

FIG. 4 depicts a flow diagram of an example method 400 for generating motion forecast data for a plurality of actors with respect to an autonomous vehicle. One or more portion(s) of the method 400 can be can be implemented by a computing system that includes one or more computing devices such as, for example, the computing systems described with reference to the other figures (e.g., the vehicle computing system 100, the interaction system 185, the operations computing system 195, etc.). Each respective portion of the method 400 can be performed by any (or any combination) of one or more computing devices. Moreover, one or more portion(s) of the method 400 can be implemented as an algorithm on the hardware components of the device(s) described herein (e.g., as in FIGS. 1 through 3B), for example, to determine motion forecast data 245 for the plurality of actors. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4 is described with reference to elements/terms described with respect to other systems and figures for example illustrated purposes and is not meant to be limiting. One or more portions of method 400 can be performed additionally, or alternatively, by other systems.

At (405), the method 400 can include inputting data that describes sensor data 140 into one or more object detection model(s) 210. For instance, an autonomous vehicle (e.g., vehicle 105) can obtain sensor data 140 associated with a surrounding environment of the autonomous vehicle (e.g., vehicle 105) via one or more vehicle sensors 125. In some implementations, the sensor data 140 can include a plurality of LIDAR sweeps, a sequence of image frames, or the like. A computing system (e.g., vehicle computing system, robotic system, etc.) can input data that describes sensor data 140 into one or more object detection model(s) 210.

At (410), the method 400 can include receiving, as an output of the object detection model(s) 210, the object detection data 230, 328 describing the features of the plurality of the actors relative to the autonomous vehicle. For example, the object detection data 230, 328 can include bounding boxes, regions or interest, or the like identifying locations of the actors. Additional examples of features of the plurality of the actors that can be described by the object detection data 230, 328 include orientation data, velocity data, size data, hidden layer data from one or more embedded layers of the object detection data, and/or any other suitable data describing the plurality of actors relative to the autonomous vehicle. The computing system (e.g., a vehicle computing system) can receive, as the output of the object detection model(s) 210, the object detection data 230, 328 that describes the features of the plurality of the actors relative to the autonomous vehicle.

At (415), the method 400 can include generating an input sequence 350 that describes the object detection data. For example, the interaction model 341 can generate the input sequence 350 by projecting each feature of the object detection data to a query and a pair of keys and values, which can each be or include respective vectors. The computing system (e.g., vehicle computing system, robotic system, etc.) can generate the input sequence 350 that describes the object detection data.

At (420), the method 400 can include analyzing the input sequence 350 using an interaction model 341 to produce an attention embedding 358. For example, the input sequence 350 and/or data that describes the input sequence 350 can be input into the interaction model 341 and the attention embedding 358 can be received as an output of the interaction model 341. For example, the attention embedding 358 can be calculated based on a relative location embedding, the keys, values, and queries. For example, the computing system (e.g., vehicle computing system, robotic system, etc.) can analyze the input sequence 350 using the interaction model 341 to produce the attention embedding 358.

At (425), the method 400 can include inputting the attention embedding 358 into the recurrent model 346. The recurrent model 346 can include one or more Multi-Layer Perceptrons which can be applied to each row of A and/or one or more residual blocks. The computing system (e.g., vehicle computing system, robotic system, etc.) can input the attention embedding 358 into the recurrent model 346.

At (430), the method 400 can include determining respective trajectories for the plurality of actors based on motion forecast data (e.g., output features 360) received as an output of a recurrent model 346. For example, the motion forecast data can describe the respective trajectories and the method 400 can include analyzing the motion forecast data to interpret or transform the motion forecast data into time-based location points representing the respective trajectories. The computing system (e.g., vehicle computing system, robotic system, etc.) can determine the respective trajectories for the plurality of actors based on motion forecast data (e.g., output features 360).

Figure 5:
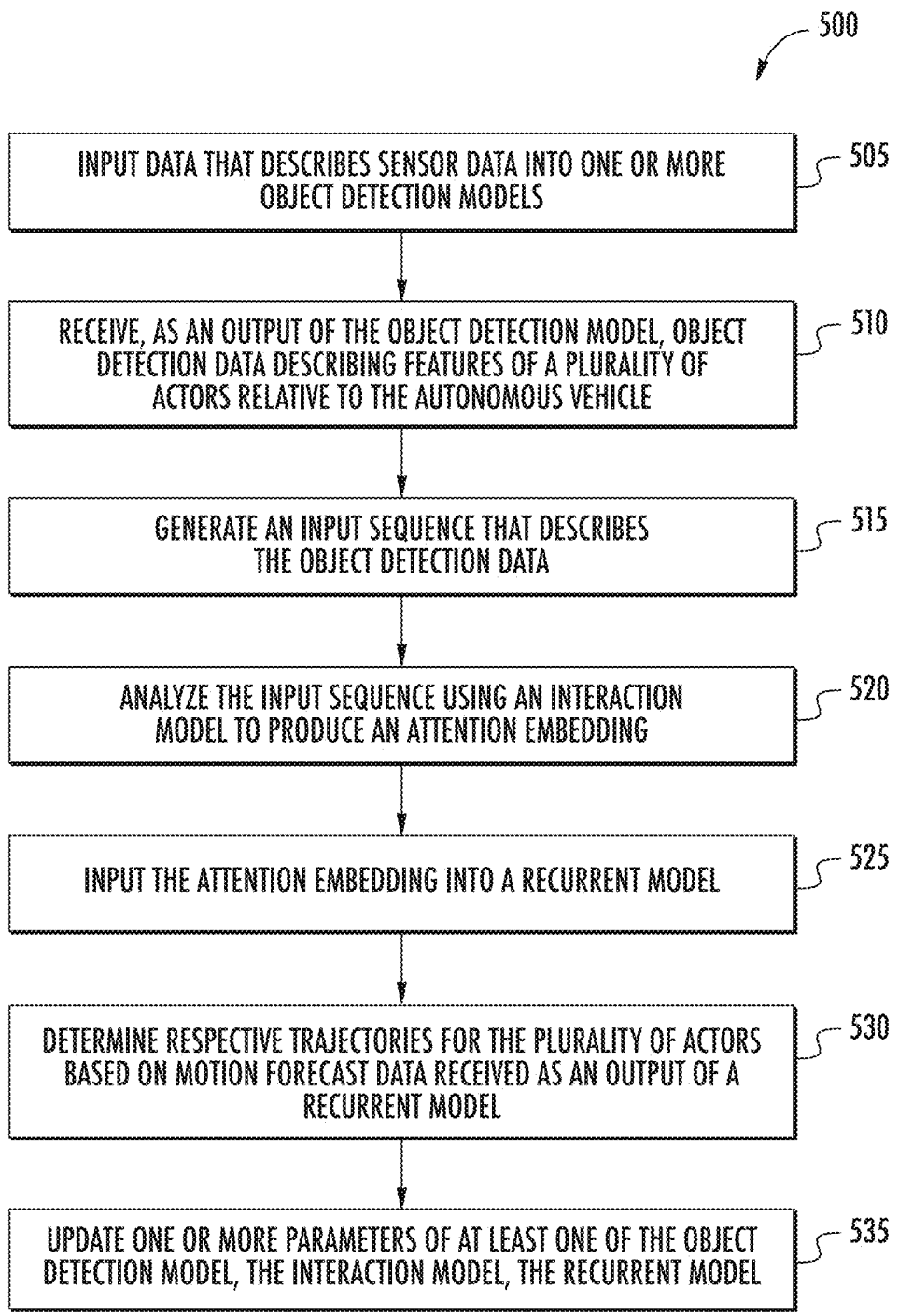
FIG. 5 depicts an example flow diagram of an example method for generating motion forecast data for a plurality of actors with respect to an autonomous vehicle according to example implementations of the present disclosure.

FIG. 5 depicts an example flow diagram of an example method 500 for training one or more machine-learned systems to generate motion forecast data 245 for a plurality of actors with respect to an autonomous vehicle. One or more portion(s) of the method 500 can be implemented by a computing system that includes one or more computing devices such as, for example, the computing systems described with reference to the other figures (e.g., the vehicle computing system 100, the interaction system 185, the operations computing system 195, etc.). Each respective portion of the method actors can be performed by any (or any combination) of one or more computing devices. Moreover, one or more portion(s) of the method actors can be implemented as an algorithm on the hardware components of the device(s) described herein (e.g., as in FIGS. 1-4), and/or on a training computing system accessible by a network. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for example illustrated purposes and is not meant to be limiting. One or more portions of method actors can be performed additionally, or alternatively, by other systems.

The method 500 can include steps 505, 510, 515, 520, 525 corresponding with 405, 410, 415, 420, 425 described above with reference to FIG. 4. The method 500 can further include, at (535), updating one or more parameters of the object detection model 329, the interaction model 341, and/or the recurrent model 346. In some implementations, two or more of the models 329, 341, 346 can be trained in an end-to-end configuration. For example, errors can be sequentially back-propagated through each of the object detection model 329, the interaction model 341, and the recurrent model 346 to evaluate a joint loss function. A gradient of the joint loss function can be calculated to determine adjust the parameter(s) to reduce the joint loss function to jointly train the models 329, 341, 346.

More specifically, the model(s) 329, 341, 346 can be fully differentiable and thus can be trainable end-to-end through back-propagation. The sum of a detection loss of the object detection model 329 and a prediction loss of the interaction model 341 and/or recurrent model 346 can be minimized. For example, an overall loss function can be a sum of respective losses for object classification, detection box regression, and future motion regression. For instance, binary cross entropy can be used as classification loss, and smooth L1 loss on each dimension of the detection box and its future motion. L1 loss generally refers to mean absolute error.

In some implementations, hard negative mining can be employed. For object detection, the distance between BEV voxels and their closest ground-truth box centers can be used to determine positive and negative samples. Samples having distances smaller than a threshold can be considered as positive. Samples having distances larger than the threshold can be considered as negative. As a large proportion of the samples are negative in dense object detection, online hard negative mining can be employed. In some implementations, only the most difficult negative samples (with largest loss) can be kept and easy negative samples can be ignored. Classification loss can be averaged over both positive and negative samples while regression loss can be averaged over positive samples only.

In some implementations, online association can be performed between detection results and ground truth labels to compute prediction loss. For each detection, the ground-truth box can be assigned with the maximum (oriented) intersection of union IoU. If a ground truth box is assigned to multiple detections, only the detection with maximum IoU can be kept while other detections are ignored. Regression on future motion can then be averaged over those detections with the associated ground-truth.

Figure 6:
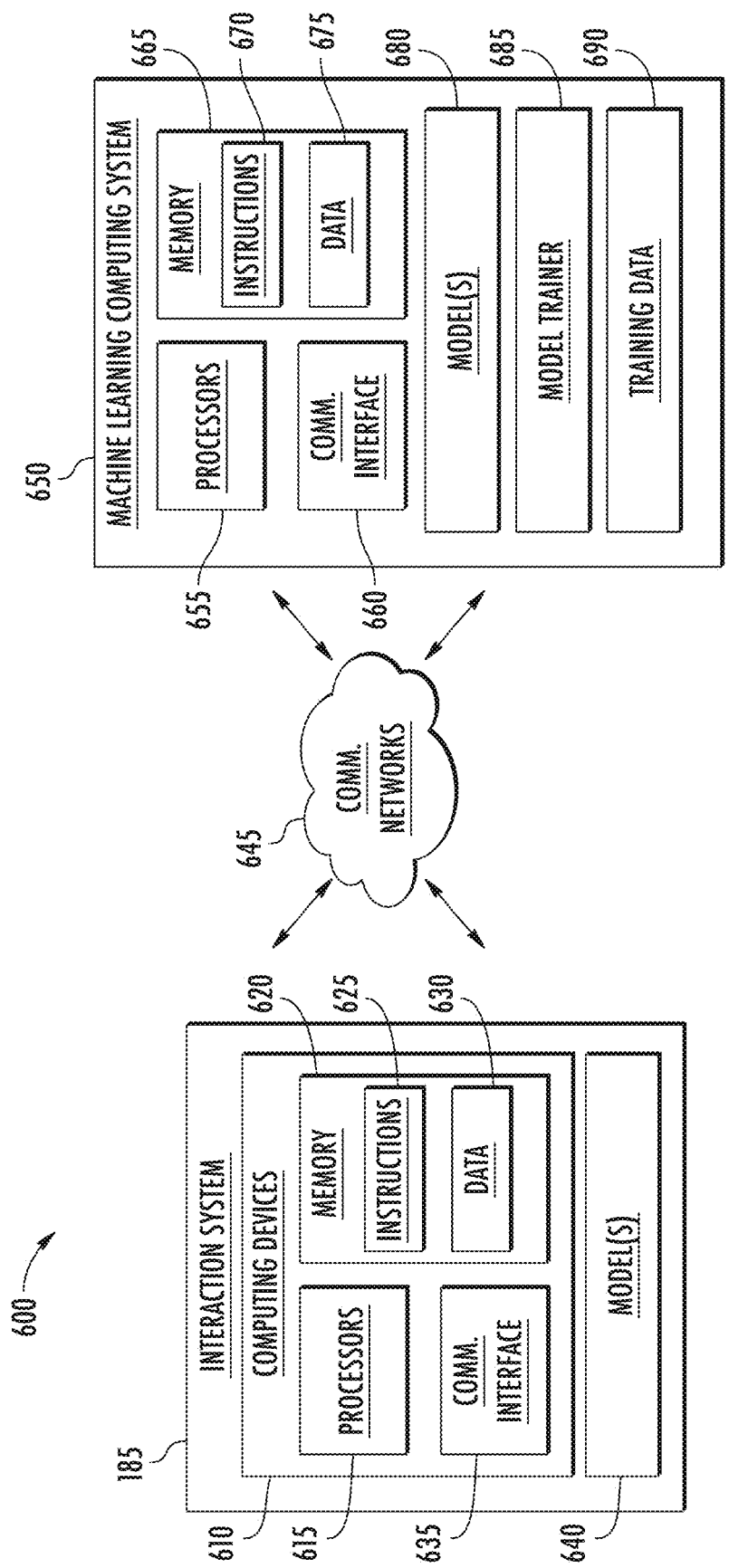
FIG. 6 depicts example system components of an example system according to example implementations of the present disclosure.

FIG. 6 depicts example system components of an example system 600 according to example implementations of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include an interaction system 185 and a machine learning computing system 650 that are communicatively coupled over one or more network(s) 640. As described herein, the interaction system 185 can be implemented onboard a vehicle (e.g., as a portion of the vehicle computing system 100) and/or can be remote from a vehicle (e.g., as a portion of an operations computing system 195). In either case, a vehicle computing system 100 can utilize the operations and model(s) of the interaction system 185 (e.g., locally, via wireless network communication, etc.).

The interaction system 185 can include one or computing device(s) 610. The computing device(s) 610 of the interaction system 185 can include processor(s) 615 and a memory 620. The one or more processor(s) 615 can be any suitable processing device (e.g., a processor core, a microprocessor, an ASIC, a FPGA, a controller, a microcontroller, etc.) and can be one processor or a plurality of processors that are operatively connected. The memory 620 can include one or more non-transitory computer-readable storage media, such as RAM, ROM, EEPROM, EPROM, one or more memory devices, flash memory devices, etc., and/or combinations thereof.

The memory 620 can store information that can be obtained by the one or more processor(s) 615. For instance, the memory 620 (e.g., one or more non-transitory computer-readable storage mediums, memory devices, etc.) can include computer-readable instructions 625 that can be executed by the one or more processors 615. The instructions 625 can be software written in any suitable programming language or can be implemented in hardware. Additionally, or alternatively, the instructions 625 can be executed in logically and/or virtually separate threads on processor(s) 615.

For example, the memory 620 can store instructions 625 that when executed by the one or more processors 615 cause the one or more processors 615 (e.g., of the interaction system 185) to perform operations such as any of the operations and functions of the interaction system 185 and/or for which the interaction system 185 is configured, as described herein, the operations for forecasting actor motion (e.g., one or more portions of method 400), the operations for training a model to forecast actor motion (e.g., one or more portions of method 500), the operations and functions of any of the models described herein, and/or for which the models are configured and/or any other operations and functions for the interaction system 185, as described herein.

The memory 620 can store data 630 that can be obtained (e.g., received, accessed, written, manipulated, generated, created, stored, etc.). The data 630 can include, for instance, sensor data, object detection data, input sequence(s), input representation(s), attention embedding(s), motion forecast data, data indicative of machine-learned model(s) (e.g., the object detection model, attention model, and/or recurrent model), and/or other data/information described herein. In some implementations, the computing device(s) 610 can obtain data from one or more memories that are remote from the interaction system 185.

The computing device(s) 610 can also include a communication interface 635 used to communicate with one or more other system(s) (e.g., other systems onboard and/or remote from a vehicle, the other systems of FIG. 1, etc.). The communication interface 635 can include any circuits, components, software, etc. for communicating via one or more networks (e.g., 645). In some implementations, the communication interface 635 can include, for example, one or more of a communications controller, receiver, transceiver, transmitter, port, conductors, software and/or hardware for communicating data/information.

According to an aspect of the present disclosure, the interaction system 185 can store or include one or more machine-learned models 640. As examples, the machine-learned model(s) 640 can be or can otherwise include the object detection model(s) 210 and/or the trajectory prediction model(s) 215. The machine-learned model(s) 640 can be or include neural networks (e.g., deep neural networks), support vector machines, decision trees, ensemble models, k-nearest neighbors models, Bayesian networks, or other types of models including linear models and/or non-linear models. Example neural networks include recurrent neural networks (e.g., long short-term memory recurrent neural networks, etc.), feed-forward neural networks (e.g., convolutional neural networks, etc.), and/or other forms of neural networks.

In some implementations, the interaction system 185 can receive the one or more machine-learned models 640 (e.g., the object detection model, attention model, and/or recurrent model), from the machine learning computing system 650 over the network(s) 645 and can store the one or more machine-learned models 640 in the memory 620 of the interaction system 185. The interaction system 185 can use or otherwise implement the one or more machine-learned models 640 (e.g., by processor(s) 615). In particular, the interaction system 185 can implement the machine learned model(s) 640 to forecast actor motion based on sensor data (and optionally map data), as described herein.

The machine learning computing system 650 can include one or more processors 655 and a memory 665. The one or more processors 655 can be any suitable processing device (e.g., a processor core, a microprocessor, an ASIC, a FPGA, a controller, a microcontroller, etc.) and can be one processor or a plurality of processors that are operatively connected. The memory 665 can include one or more non-transitory computer-readable storage media, such as RAM, ROM, EEPROM, EPROM, one or more memory devices, flash memory devices, etc., and/or combinations thereof.

The memory 665 can store information that can be accessed by the one or more processors 655. For instance, the memory 665 (e.g., one or more non-transitory computer-readable storage mediums, memory devices, etc.) can store data 675 that can be obtained (e.g., generated, retrieved, received, accessed, written, manipulated, created, stored, etc.). In some implementations, the machine learning computing system 650 can obtain data from one or more memories that are remote from the machine learning computing system 650.

The memory 665 can also store computer-readable instructions 670 that can be executed by the one or more processors 655. The instructions 670 can be software written in any suitable programming language or can be implemented in hardware. Additionally, or alternatively, the instructions 670 can be executed in logically and/or virtually separate threads on processor(s) 655. The memory 665 can store the instructions 670 that when executed by the one or more processors 655 cause the one or more processors 655 to perform operations. The machine learning computing system 650 can include a communication interface 660, including devices and/or functions similar to that described with respect to the interaction system 185.

In some implementations, the machine learning computing system 650 can include one or more server computing devices. If the machine learning computing system 650 includes multiple server computing devices, such server computing devices can operate according to various computing architectures, including, for example, sequential computing architectures, parallel computing architectures, or some combination thereof.

In addition, or alternatively to the model(s) 640 at the interaction system 185, the machine learning computing system 650 can include one or more machine-learned model(s) 680. As examples, the machine-learned model(s) 680 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 680 can be similar to and/or the same as the machine-learned models 640, and/or any of the models discussed herein with reference to FIGS. 1 through 3B.

As an example, the machine learning computing system 650 can communicate with the interaction system 185 according to a client-server relationship. For example, the machine learning computing system 650 can implement the machine-learned models 680 to provide a web service to the interaction system 185 (e.g., including on a vehicle, implemented as a system remote from the vehicle, etc.). For example, the web service can provide machine-learned models to an entity associated with a vehicle; such that the entity can implement the machine-learned model(s) (e.g., to forecast actor motion, etc.). Thus, machine-learned models 680 can be located and used at the interaction system 185 (e.g., on the vehicle 105, at the operations computing system 195, etc.) and/or the machine-learned models 680 can be located and used at the machine learning computing system 650.

In some implementations, the machine learning computing system 650 and/or the interaction system 185 can train the machine-learned model(s) 640 and/or 680 through the use of a model trainer 685. The model trainer 685 can train the machine-learned models 640 and/or 680 using one or more training or learning algorithm(s), for example as described above with reference to FIG. 5. The model trainer 785 can perform backwards propagation of errors, supervised training techniques using a set of labeled training data, and/or unsupervised training techniques using a set of unlabeled training data. The model trainer 685 can perform a number of generalization techniques to improve the generalization capability of the models being trained. Generalization techniques include weight decays, dropouts, or other techniques.

The model trainer 680 can train a machine-learned model (e.g., 640 and/or 680) based on a set of training data 690. The training data 690 can include, for example, labeled datasets and/or unlabeled datasets.

In some implementations, the training data 690 can be taken from the same vehicle as that which utilizes the model(s) 640 and/or 680. Accordingly, the model(s) 640 and/or 680 can be trained to determine outputs in a manner that is tailored to that particular vehicle. Additionally, or alternatively, the training data 690 can be taken from one or more different vehicles than that which is utilizing the model(s) 640 and/or 680. The model trainer 685 can be implemented in hardware, firmware, and/or software controlling one or more processors. Additionally, or alternatively, other data sets can be used to train the model(s) (e.g., models 640 and/or 680) including, for example, publicly accessible datasets (e.g., labeled data sets, unlabeled data sets, etc.).

The network(s) 645 can be any type of network or combination of networks that allows for communication between devices. In some embodiments, the network(s) 645 can include one or more of a local area network, wide area network, the Internet, secure network, cellular network, mesh network, peer-to-peer communication link and/or some combination thereof and can include any number of wired or wireless links. Communication over the network(s) 645 can be accomplished, for instance, via a network interface using any type of protocol, protection scheme, encoding, format, packaging, etc.

FIG. 6 illustrates one example system 600 that can be used to implement the present disclosure. Other computing systems can be used as well. For example, in some implementations, the interaction system 185 can include the model trainer 685 and the training dataset 690. In such implementations, the machine-learned models 640 can be both trained and used locally at the interaction system 185 (e.g., at the vehicle 105).

Computing tasks discussed herein as being performed at computing device(s) remote from the vehicle 105 can instead be performed at the vehicle 105 (e.g., via the vehicle computing system 100), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Figure 7:
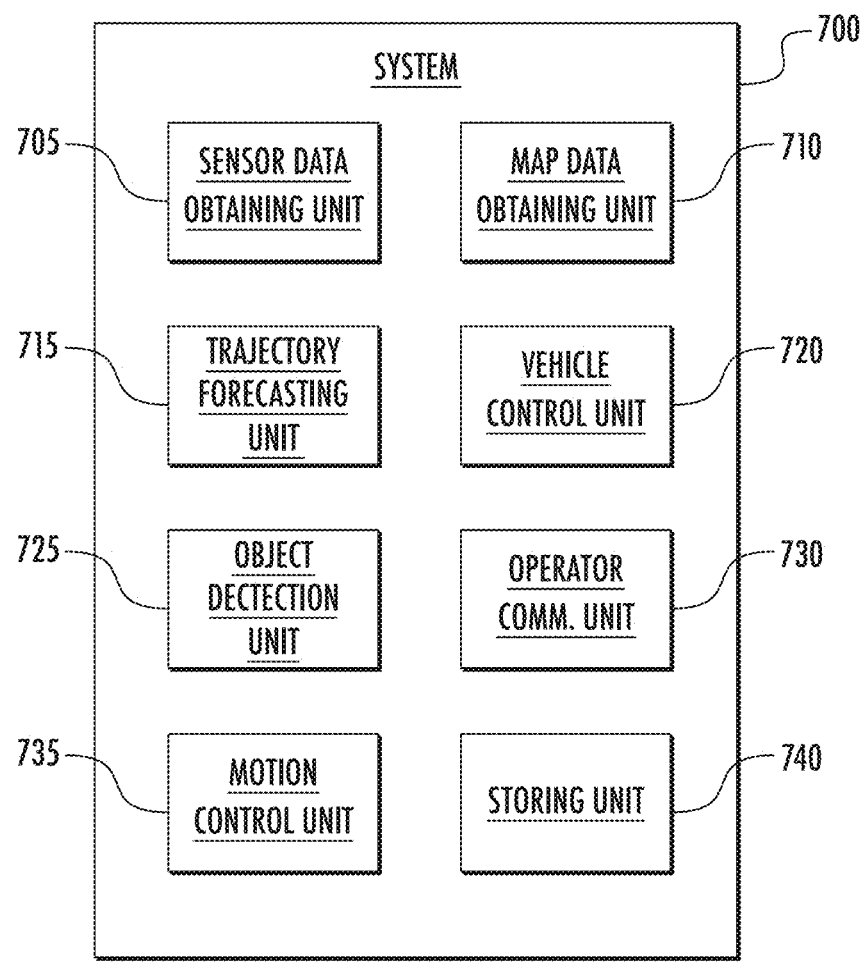
FIG. 7 depicts example system components of an example system according to example implementations of the present disclosure.

FIG. 7 depicts example system components of an example system according to example implementations of the present disclosure. Various means can be configured to perform the methods and processes described herein. For example, a computing system 700 can include sensor data obtaining unit(s) 705, map data obtaining unit(s) 710, machine-learned object recognition/detection model application unit(s) 725, trajectory/behavior forecasting unit(s) 715, vehicle controlling unit(s) 720, operator communication unit(s) 730, data storing unit(s) 740, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data from one or more sensors that generate sensor data relative to an autonomous vehicle. In some implementations, the means can be configured to obtain sensor data associated with the autonomous vehicle's surrounding environment as well as the position and movement of the autonomous vehicle. A sensor data obtaining unit 705 is one example of a means for obtaining such sensor data as described herein.

The means can be configured to access or otherwise obtain map data associated with a surrounding geographic environment of the autonomous vehicle. More particularly, in some implementations, the means can be configured to access or otherwise obtain map data that provides information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the means can be configured to access or otherwise obtain map data that is provided in a birds-eye view representation, such as generated by rasterization or other suitable processing format. A map data obtaining unit 710 is one example of a means for obtaining such map data as described herein.

The means can be configured to provide, as input to a machine-learned object detection model, the sensor data, and to receive the object detection data describing the features of the plurality of actors relative to the autonomous vehicle as an output of the machine-learned object detection. The means can be configured to process the map data (e.g., geometric and/or semantic map priors) and the sensor data to generate data for inputting into the machine-learned object detection model. For example, ground height can be subtracted from the Z-value of each LiDAR point before voxelization. As a result, the variation caused by ground slope can be removed. Map data and/or semantic priors in the form of road and lane masks can be extracted. Each semantic prior can be or include a one-channel raster image in BEV depicting the drivable surface and all the lanes respectively. The means can augment the LiDAR voxel representation through concatenation with semantic map priors. The output space of the input representation can be defined in BEV, which can provide for efficient feature sharing between perception and prediction. Thus, the means can process sensor and map data to generate an input representation that can be input the object detection model. A machine learned object detection model unit 725 is one example of a means for processing the sensor data and map data to generate the input representation and/or inputting the input representation into the machine learned object detection model and receiving multiple outputs therefrom.

The means can be configured to generate motion forecast data that describes or predicts the trajectory/behavior of a plurality of actors with respect to the autonomous vehicle. The means can receive object detection data describing the features of the plurality of the actors relative to the autonomous vehicle from the machine learned object detection model(s). The means can input an input sequence that describes the object detection data into an interaction model and receive, as an output of the interaction model, an attention embedding. The means can input the attention embedding into the recurrent model, and receive, as an output of the recurrent model, the motion forecast data that describes the respective trajectories for the plurality of actors. The trajectory/behavior forecasting unit(s) 715 is one example of a means for performing the above operations.

The means can be configured to determine a motion plan for the autonomous vehicle based at least in part on the motion forecast data. The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning/control unit 735 is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit 720 is one example of a means for controlling motion of the autonomous vehicle to execute the motion plan.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system, comprising:
   an object detection model configured to receive an input representation that describes sensor data, and in response to receipt of the input representation output object detection data describing features of a plurality of actors relative to an autonomous vehicle;
   an interaction model comprising an attention model and a context aggregation model, wherein:
   the attention model is configured to receive input sequence, and in response to receipt of the input sequence, generate attentional weights;
   the context aggregation model is configured to receive the attentional weights and the input sequence, and in response to receipt of the attention weights and the input sequence, generate an attention embedding with respect to the plurality of actors;
   a recurrent model configured to receive the attention embedding, and in response to receipt of the attention embedding, generate motion forecast data with respect to the plurality of actors, the motion forecast data describing respective trajectories for the plurality of actors;
   a memory that stores a set of instructions;
   one or more processors which use the set of instructions to:
   input the input representation that describes the sensor data into the object detection model;
   receive, as an output of the object detection model, the object detection data describing the features of the plurality of the actors relative to the autonomous vehicle;
   generate an input sequence that describes the object detection data;
   analyze the input sequence using an interaction model to produce, as an output of the interaction model, the attention embedding;
   input the attention embedding into the recurrent model; and
   determine respective trajectories for the plurality of actors based on motion forecast data received as an output of the recurrent model.

2. The computing system of claim 1, wherein:
   the interaction model is further configured to generate a relative location embedding based on the object detection data in response to receipt of the object detection data, and wherein the relative location embedding describes relative respective locations of the plurality of actors with respect to the autonomous vehicle; and
   the interaction model is further configured to generate, based at least in part on the relative location embedding, the input sequence that is received by the attention model.

3. The computing system of claim 1, wherein the context aggregation model is configured to apply the attentional weights with respect to the object detection data to generate the attention embedding.

4. The computing system of claim 1, wherein the recurrent model comprises at least one residual block.

5. The computing system of claim 4, wherein the recurrent model comprises at least one multi-layer perceptron.

6. The computing system of claim 5, wherein the one or more processors further use the set of instructions to:
   input the attention embedding into the at least one multi-layer perceptron of the recurrent model;
   receive an output from the at least one multi-layer perceptron; and
   combine the output from the least one multi-layer perceptron with the input sequence.

7. The computing system of claim 1, wherein the one or more processors further use the set of instructions to generate the input representation that describes the sensor data by:
   voxelizing the sensor data to generate voxel representations; and
   augmenting the voxel representations with map data to generate the input representation.

8. The computing system of claim 1, wherein the interaction model is configured to generate an input sequence by projecting one or more features of the object detection data to a query and a pair of key values.

9. The computing system of claim 1, wherein the motion forecast data is indicative of respective interactions of the plurality of actors.

10. The computing system of claim 1, wherein the respective trajectories for the plurality of actors depend on each other.

11. A computer-implement method for forecasting actor motion, the method comprising:

inputting, by a computing system comprising one or more computing devices, an input representation that describes sensor data into an object detection model that is configured to receive the input representation that describes the sensor data, and in response to receipt of the input representation, output object detection data describing features of a plurality of actors relative to an autonomous vehicle;

receiving, by the computing system and as an output of the object detection model, the object detection data describing the features of the plurality of the actors relative to the autonomous vehicle;

generating, by the computing system, an input sequence using an interaction model;

analyzing, by the computing system, the input sequence using an attention model to generate attentional weights;

receiving, by the computing system, the attentional weight and input sequence using a context aggregation model, and in response to receipt of the attentional weights and the input sequence, generate an attention embedding with respect to the plurality of actors;

inputting, by the computing system, the attention embedding into a recurrent model that is configured to receive the attention embedding, and in response to receipt of the attention embedding, generate motion forecast data with respect to the plurality of actors, the motion forecast data describing respective trajectories for the plurality of actors; and determining, by the computing system, respective trajectories for the plurality of actors based on motion forecast data received as an output of a recurrent model, the recurrent model being configured to receive the attention embedding, and in response to receipt of the attention embedding, generate motion forecast data with respect to the plurality of actors.

12. The computer-implemented method of claim 11, wherein:

the interaction model is further configured to generate a relative location embedding based on the object detection data in response to receipt of the object detection data, and wherein the relative location embedding describes relative respective locations of the plurality of actors with respect to the autonomous vehicle; and the interaction model is further configured to generate, based on the relative location embedding, the input sequence that is received by the attention model.

13. The computer-implemented method of claim 11, wherein the context aggregation model is configured to apply the attentional weights with respect to the object detection data to generate the attention embedding.

14. The computer-implemented method of claim 11, wherein the recurrent model comprises at least one residual block.

15. The computer-implemented method of claim 14, wherein the recurrent model comprises at least one multi-layer perceptron.

16. The computer-implemented method of claim 15, further comprising:

inputting, by the computing system, the attention embedding into the at least one multi-layer perceptron of the recurrent model;

receiving, by the computing system, an output from the at least one multi-layer perceptron; and combining, by the computing system, the output from the least one multi-layer perceptron with the input sequence.

17. The computer-implemented method of claim 11, wherein the method further comprises generating, by the computing system, the input sequence.

18. The computer-implemented method of claim 11, wherein the method further comprises:

generating, by the computing system, the input representation that describes the sensor data by voxelizing the sensor data to generate voxel representation and augmenting the voxel representations with map data to generate the input representation.

19. A computer-implement method for training one or more machine-learned systems, the method comprising:

inputting, by a computing system comprising one or more computing devices, an input representation that describes sensor data into an object detection model that is configured to receive the input representation that describes the sensor data, and in response to receipt of the input representation, output object detection data describing features of a plurality of actors relative to an autonomous vehicle;

receiving, by the computing system and as an output of the object detection model, the object detection data describing the features of the plurality of the actors relative to the autonomous vehicle;

generating, by the computing system, an input sequence using an interaction model;

analyzing, by the computing system, the input sequence using an attention model to generate attentional weights, receiving, by the computing system, the attentional weight and input sequence using a context aggregation model, and in response to receipt of the attentional weights and the input sequence, generate an attention embedding with respect to the plurality of actors;

inputting, by the computing system, the attention embedding into a recurrent model that is configured to receive the attention embedding, and in response to receipt of the attention embedding, generate motion forecast data with respect to the plurality of actors, the motion forecast data describing respective trajectories for the plurality of actors;

determining, by the computing system, respective trajectories for the plurality of actors based on motion forecast data received as an output of a recurrent model, the recurrent model being configured to receive the attention embedding, and in response to receipt of the attention embedding, generate motion forecast data with respect to the plurality of actors; and updating, by the computing system, one or more parameters of at least one of the object detection model, the interaction model, or the recurrent model.

20. The computer-implemented method of claim 19, wherein updating, by the computing system, one or more parameters of the at least one of the object detection model, the interaction model, or the recurrent model comprises training, in an end-to-end configuration, at least two of the object detection model, the interaction model, or the recurrent model.

* * * * *